United States Patent
Nishikuma et al.

(10) Patent No.: US 8,967,441 B2
(45) Date of Patent: Mar. 3, 2015

(54) MAGNET SPLITTING DEVICE AND MAGNET SPLITTING METHOD

(75) Inventors: Yasushi Nishikuma, Toyota (JP); Yasuji Taketsuna, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 419 days.

(21) Appl. No.: 13/383,091

(22) PCT Filed: Jul. 10, 2009

(86) PCT No.: PCT/JP2009/062583
§ 371 (c)(1),
(2), (4) Date: Jan. 9, 2012

(87) PCT Pub. No.: WO2011/004490
PCT Pub. Date: Jan. 13, 2011

(65) Prior Publication Data
US 2012/0104064 A1 May 3, 2012

(51) Int. Cl.
*B65H 35/10* (2006.01)
*B26F 3/00* (2006.01)
*H01F 41/02* (2006.01)
*H02K 15/03* (2006.01)

(52) U.S. Cl.
CPC .......... *B26F 3/002* (2013.01); *H01F 41/0253* (2013.01); *H02K 15/03* (2013.01)
USPC ........................................ 225/96.5; 225/101

(58) Field of Classification Search
USPC ................... 225/96, 96.5, 97, 100, 101, 103
See application file for complete search history.

(56) References Cited

U.S. PATENT DOCUMENTS

| 4,136,604 | A * | 1/1979 | Schmidt ........................ 493/340 |
| 6,655,566 | B1 * | 12/2003 | Martin et al. ................. 225/101 |
| 7,540,221 | B1 * | 6/2009 | Schmidt ............................ 83/39 |

FOREIGN PATENT DOCUMENTS

| DE | 19727591 A1 * | 2/1998 |
| JP | 61-079505 U | 5/1986 |
| JP | 07-040296 A | 2/1995 |
| JP | 08-268728 A | 10/1996 |
| JP | 11-004555 A | 1/1999 |
| JP | 2001-277136 A | 10/2001 |
| JP | 2002-018797 A | 1/2002 |
| JP | 2003-089538 A | 3/2003 |
| JP | 2006-005117 A | 1/2006 |
| JP | 2008-140974 A | 6/2008 |
| JP | 2009-142081 A | 6/2009 |
| WO | 2012-131988 A1 | 4/2012 |

OTHER PUBLICATIONS

International Search Report of PCT/JP2009/062583 mailed Oct. 13, 2009.

* cited by examiner

*Primary Examiner* — Kenneth E. Peterson
*Assistant Examiner* — Jennifer Swinney
(74) *Attorney, Agent, or Firm* — Kenyon & Kenyon LLP

(57) ABSTRACT

A magnet splitting device includes a one-side holder for holding a plurality of pre-split magnets on one sides of respective splitting grooves, an other-side holder for holding the magnets on the other sides, and an actuating unit for causing relative movement of the other-side holder to split the magnets all at once. The other-side holder includes a plurality of other-side independent holding parts for holding the magnets independently. The actuating unit includes a plurality of independent actuating parts for moving the other-side independent holding parts independently and a simultaneous operating part for simultaneously operating the holding parts.

10 Claims, 15 Drawing Sheets

US 8,967,441 B2

MAGNET SPLITTING DEVICE AND MAGNET SPLITTING METHOD

CROSS-REFERENCE TO RELATED APPLICATIONS

This is a 371 national phase application of PCT/JP2009/062583 filed on 10 Jul. 2009, the entire contents of which are incorporated herein by reference.

TECHNICAL FIELD

The present invention relates to a magnet splitting device for splitting pre-split magnets with splitting grooves along the splitting grooves and also relates to a method for splitting pre-split magnets with splitting grooves along the splitting grooves.

BACKGROUND ART

Conventionally, splitting devices for splitting substrates made of a brittle material along splitting grooves formed therein into separate pieces are known. For example, Patent Documents 1 to 3 listed below disclose such splitting devices and splitting methods thereof.

The dividing jig (splitting device) disclosed in Patent Document 1 includes a left and a right holding members for holding a ceramic substrate formed with dividing grooves (splitting grooves) from a left and a right direction of a dividing groove, and rotating plates respectively fixed to the left and the right holding members and rotatable around their own rotation axis. With this dividing jig, the rotating plates are rotated around their rotation axis such that the holding member on one side only is rotated to apply a bending moment to the ceramic substrate held by the left and the right holding members so as to split apart the ceramic substrate along the dividing groove.

The splitting device disclosed in Patent Document 2 includes a pair of substrate holding members for holding a brittle material substrate on both sides of a split line (splitting groove) formed in the substrate. One of the substrate holding members is disposed swingably around a shaft located substantially directly below and parallel to the split line. With this splitting device, one of the substrate holding members is turned around the shaft to apply a splitting load to the brittle material substrate so as to split apart this substrate along the split line.

The breaking device (splitting device) disclosed in Patent Document 3 includes a first product table and a second product table on which a brittle material substrate formed with a scribed line (splitting groove) is placed such that the scribed line is positioned in a gap between the tables. This breaking device also includes a first product clamp unit for securing the brittle material substrate between itself and the first product table and a second product clamp unit for securing the brittle material substrate between itself and the second product table. This breaking device further includes an inclining mechanism allowing for integral rotation of the second product table and the second product clamp unit around an inclination axis positioned parallel to the scribed line as the rotation axis. With this breaking device, the second product table and the second product clamp unit are integrally rotated around the inclination axis as the rotation axis by the inclining mechanism to apply a splitting load to the brittle material substrate so as to split apart the brittle material substrate along the scribed line.

RELATED ART DOCUMENTS

Patent Documents

Patent Document 1: JP7 (1995)-40296A
Patent Document 2: JP2002-18797A
Patent Document 3: JP2003-89538A

DISCLOSURE OF THE INVENTION

Problems to be Solved by the Invention

However, the dividing jig of Patent Document 1, the splitting device of Patent Document 2, and the breaking device of Patent Document 3, are all devices for splitting apart a single substrate and not devices that simultaneously hold a plurality of substrates and split them apart all at once. If a plurality of substrates were held simultaneously and split apart all at once using a conventional splitting device, firstly, there would be variations in the force to hold respective substrates due to dimensional variations of discrete substrates. Therefore, slippage would occur between the substrates and the members holding them (above-mentioned left and right holding members, substrate holding members, product tables and clamp units) in splitting, whereby splitting cracks may deviate or bifurcate, split surfaces may be inclined, or the substrates may suffer chipping, i.e., the split surfaces could not be formed precisely. Secondly, variations in strength of discrete substrates would cause the substrates to be split at different timings, whereby substrates split apart later would be subjected to a sudden, large splitting load. As a result, slippage would occur between the substrates and the members holding them so that, likewise, the split surfaces could not be formed precisely.

The present invention was devised in view of such circumstances, and its object is to provide a magnet splitting device for splitting pre-split magnets with splitting grooves along the splitting grooves and a magnet splitting method, with which a plurality of pre-split magnets are simultaneously held and split apart all at once to improve productivity of split magnets, and with which split surfaces are formed precisely so that dimensional accuracy of split magnets can be improved.

Means of Solving the Problems

One aspect of the present invention to solve the above problem provides a magnet splitting device for splitting a pre-split magnet with a splitting groove along the splitting groove, comprising: a one-side holder for holding the pre-split magnet on one side of the splitting groove and an other-side holder for holding the pre-split magnet on the other side, the one-side holder and the other-side holder being configured to split apart the pre-split magnet along the splitting groove as a starting point by relative movement of the other-side holder relative to the one-side holder in such a manner as to widen an opening of the splitting groove more than a bottom part of the groove; and an actuating unit configured to generate the relative movement of the other-side holder, wherein the one-side holder and the other-side holder are configured to hold a plurality of pre-split magnets simultaneously and to split apart these pre-split magnets all at once, the other-side holder includes a plurality of other-side independent holding parts configured to respectively hold the other sides of the pre-split magnets independently and undergo the relative movement independently from each other, and the actuating unit includes: a plurality of independent actuating parts configured to generate the relative movement independently in the respective other-side independent holding parts; and a simultaneous operating part configured to operate the independent actuating parts simultaneously.

With this magnet splitting device, the one-side holder and the other-side holder are configured to hold a plurality of pre-split magnets simultaneously and split them apart all at once, so that productivity of split magnets can be improved.

In addition, the other-side holder includes the plurality of other-side independent holding parts therein to respectively hold the pre-split magnets independently. Therefore, the pre-split magnets can be held respectively appropriately even if there are dimensional variations between discrete pre-split magnets. Slippage is thereby prevented from occurring between the pre-split magnets and the other-side holder in splitting or dividing the magnets, so that troubles such as splitting cracks deviating or bifurcating, split surfaces being inclined, or split magnets being chipped, can be prevented. Therefore, the split surfaces can be formed precisely, and dimensional accuracy of the split magnets can be improved.

Further, the other-side holder includes the plurality of other-side independent holding parts and the actuating unit includes the plurality of independent actuating parts and the simultaneous operating part. Accordingly, the pre-split magnets can be subjected respectively to a splitting load and split apart independently from each other. Therefore, even if these pre-split magnets are split apart at different timings due to variations in strength between discrete pre-split magnets, pre-split magnets split apart later can be prevented from being subjected to a sudden, large splitting load. Slippage is thereby prevented from occurring between the pre-split magnets and the one-side holder and the other-side holder when splitting the magnets, so that the troubles in magnet splitting as described above can be prevented. In this respect, too, the split surfaces can be formed precisely, and dimensional accuracy of the split magnets can be improved.

The "other-side independent holding parts" each hold the plurality of pre-split magnets independently from each other as described above, and may include, for example, resilient members holding the pre-split magnets with their own resiliency as will be described later. Alternatively, the other-side independent holding parts may include, for example, hydraulic cylinders for holding the pre-split magnets with hydraulic pressure, or, air cylinders for holding the pre-split magnets with compressed air.

The "independent actuating parts" each generate the relative movement of the other-side independent holding parts independently from each other as described above, and may include, for example, resilient members independently urging the other-side independent holding parts to generate the relative movement of the other-side independent holding parts as will be described later. Alternatively, they may include, for example, hydraulic cylinders for independently pressing the other-side independent holding parts with hydraulic pressure to generate the relative movement of the other-side independent holding parts, or, air cylinders for independently pressing the other-side independent holding parts with compressed air to generate the relative movement of the other-side independent holding parts.

The "simultaneous operating part" operates the independent actuating parts simultaneously as described above, and the configuration and the shape of the simultaneous operating part may be suitably changed in accordance with the configuration and the shape of the independent actuating parts. For example, if the independent actuating parts include the resilient members as described above, the simultaneous operating part may be formed to be movable such that it urges, by its movement, the resilient members included in respective independent actuating parts simultaneously in a direction in which the relative movement is generated. Also, if the independent actuating parts include the hydraulic cylinders or air cylinders as described above, the simultaneous operating part may be a supply device consisting of pumps and piping, etc. for simultaneously supplying oil or compressed air to the hydraulic cylinders or air cylinders included in respective independent actuating parts.

Further, in the magnet splitting device described above, preferably, the simultaneous operating part is formed to be movable itself, and the independent actuating parts each include an actuating resilient member interposed between the simultaneous operating part and each of the other-side independent holding parts so that each of the other-side independent holding parts is urged in a direction in which the relative movement is generated by the movement of the simultaneous operating part.

In this magnet splitting device, the simultaneous operating part of the actuating unit is formed to be movable itself. Each of the independent actuating parts of the actuating unit includes the actuating resilient member that urges the other-side independent holding part in the direction to generate the relative movement when the simultaneous operating part is moved. Thus, while having a simple structure, the actuating unit can simultaneously and independently generate the relative movement of the other-side independent holding parts.

Further, in any of the magnet splitting devices described above, preferably, the other-side independent holding parts each include a holding resilient member resiliently holding the other sides of the pre-split magnets.

In this magnet splitting device, the other-side independent holding parts each include a holding resilient member that resiliently holds the other side of the pre-split magnets, so that, while having a simple structure, the other-side independent holding parts can hold the respective pre-split magnets appropriately and independently from each other.

Further, in any of the magnet splitting devices described above, preferably, the pre-split magnet is in a form having a first main surface with the splitting grooves and a second main surface parallel thereto; the one-side holder includes a first one-side holding part pressing the first main surface and a second one-side holding part pressing the second main surface and sandwiching the pre-split magnet between itself and the first one-side holding part; the other-side independent holding part of the other-side holder includes a first other-side independent holding portion pressing the first main surface and a second other-side independent holding portion pressing the second main surface and sandwiching the pre-split magnet between itself and the first other-side independent holding portion; the first one-side holding part is formed to press a first one-side pressed region of the first main surface, the region extending along the splitting groove and including a first groove edge located on the one side of the splitting groove; the first other-side independent holding portion is formed to press a first other-side pressed region of the first main surface, the region extending along the splitting groove and including a second groove edge located on the other side of the splitting groove; the second one-side holding part is formed to press a second one-side pressed region of the second main surface, the region extending along and including a first groove edge corresponding portion that will appear on the second main surface when the first groove edge is projected in a direction orthogonal to the second main surface; and the second other-side independent holding portion is formed to press a second other-side pressed region of the second main surface, the region extending along and including a second groove edge corresponding portion that will appear on the second main surface when the second groove edge is projected in a direction orthogonal to the second main surface.

Since magnets have high strength and require a very large splitting load as compared to when splitting a substrate made of, for example, glass, the holding force for holding the pre-split magnet needs to be accordingly large. If, however, the holding force applied by the one-side holder and the other-side holder (other-side independent holding parts) is larger, when the magnet is split apart, splitting cracks tend to proceed toward a part of the pre-split magnet where stress by holding is concentrated. For this reason, if the pre-split magnet is held by the one-side holder and the other-side holder (other-side independent holding parts) at portions away from the splitting groove, troubles such as splitting cracks deviating or bifurcating, split surfaces being inclined, or split magnets being chipped, are likely to occur.

In this respect, with the magnet splitting device described above, of the one-side holder, the first one-side holding part presses the first one-side pressed region of the first main surface, while the second one-side holding part presses the second one-side pressed region of the second main surface. Of the other-side independent holding part, the first other-side independent holding portion presses the first other-side pressed region of the first main surface, while the second other-side independent holding portion presses the second other-side pressed region of the second main surface. Therefore, the pressing force exerted by the one-side holder and the other-side holder (other-side independent holding parts) is applied over to the first groove edge and the second groove edge of the splitting groove on the first main surface side, and to the first groove edge corresponding portion and the second groove edge corresponding portion on the second main surface side, so that troubles in magnet splitting such as splitting cracks deviating or bifurcating, split surfaces being inclined, or split magnets being chipped, can be prevented. Therefore, the split surfaces can be formed precisely, and dimensional accuracy of the split magnets can further be improved.

Further, in the magnet splitting device described above, preferably, the pre-split magnet has a rectangular parallelepiped shape with a third side face and a fourth side face connecting the first main surface and the second main surface and parallel to each other, and a fifth side face and a sixth side face parallel to each other, with the splitting grooves each being orthogonal to the third side face and the fourth side face; the first one-side holding part is formed to press the first one-side pressed region excluding a first corner portion made between the first main surface and the third side face and a second corner portion made between the first main surface and the fourth side face; and the first other-side independent holding portion is formed to press the first other-side pressed region excluding the first corner portion and the second corner portion.

In the case of the pre-split magnet having a rectangular parallelepiped shape as described above, when the one-side holder and the other-side holder hold such a pre-split magnet by pressing the magnet including the first corner portion and the second corner portion, stress is apt to concentrate at the first corner portion and the second corner portion in splitting the magnet, thereby causing chipping at the first corner portion and the second corner portion.

In this respect, with the magnet splitting device described above, the pre-split magnet is held by the one-side holder and the other-side holder such that the first one-side holding part presses the first one-side pressed region of the first main surface excluding the first corner portion and the second corner portion, while the first other-side independent holding portion presses the first other-side pressed region of the first main surface excluding the first corner portion and the second corner portion. Therefore, no large stress is applied to the first corner portion and the second corner portion in splitting the magnet, so that chipping at the first corner portion and the second corner portion is prevented from occurring.

Further, in the magnet splitting device described above, preferably, the second one-side holding part is formed to press the second one-side pressed region excluding a third corner portion made between the second main surface and the third side face and a fourth corner portion made between the second main surface and the fourth side face; and the second other-side independent holding portion is formed to press the second other-side pressed region excluding the third corner portion and the fourth corner portion.

In the case of the pre-split magnet having a rectangular parallelepiped shape as described above, when the one-side holder and the other-side holder hold such a pre-split magnet by pressing the magnet including the third corner portion and the fourth corner portion, stress is apt to concentrate at the third corner portion and the fourth corner portion in splitting the magnet, thereby causing chipping at the third corner portion and fourth corner portion.

In this respect, with the magnet splitting device described above, the pre-split magnet is held by the one-side holder and the other-side holder such that the second one-side holding part presses the second one-side pressed region of the second main surface excluding the third corner portion and the fourth corner portion, while the second other-side independent holding portion presses the second other-side pressed region of the second main surface excluding the third corner portion and the fourth corner portion. Therefore, no large stress is applied to the third corner portion and the fourth corner portion in splitting the magnet, so that chipping at the third corner portion and the fourth corner portion is prevented from occurring.

Further, another aspect provides a magnet splitting method for splitting a plurality of pre-split magnets with splitting grooves along the respective splitting grooves, comprising: a magnet holding step of holding one side and the other side of a splitting groove of each of the pre-split magnets respectively with a one-side holder and an other-side holder; and a magnet splitting step of splitting apart the pre-split magnets respectively along their splitting grooves as starting points by relative movement of the other-side holder relative to the one-side holder in such a manner as to widen openings of the splitting grooves more than bottom parts thereof; wherein the magnet holding step includes simultaneously holding the pre-split magnets such that a plurality of other-side independent holding parts included in the other-side holder each hold the other sides of the pre-split magnets respectively independently, and the magnet splitting step includes generating the relative movement independently from each other and simultaneously in the other-side independent holding parts to split apart the pre-split magnets all at once.

In this magnet splitting method, the plurality of pre-split magnets are held in the magnet holding step and these magnets are split apart all at once in the magnet splitting step. Accordingly, productivity of split magnets can be improved.

In addition, the plurality of other-side independent holding parts respectively hold the pre-split magnets independently from each other in the magnet holding step, so that the pre-split magnets can be respectively appropriately held even if there are dimensional variations between discrete pre-split magnets. Slippage is thereby prevented from occurring between the pre-split magnets and the other-side holder in the magnet splitting step. Thus, troubles such as splitting cracks deviating or bifurcating, split surfaces being inclined, or split magnets being chipped, can be prevented. Therefore, the split surfaces can be formed precisely, and dimensional accuracy of the split magnets can be improved.

In the magnet splitting step, further, the other-side independent holding parts are relatively moved independently from each other and simultaneously to split apart the pre-split magnets all at once. Even if these pre-split magnets are split apart at different timings due to variations in strength between discrete pre-split magnets, pre-split magnets split apart later can be prevented from being subjected to a sudden, large splitting load. Slippage is thereby prevented from occurring between the pre-split magnets and the one-side holder and the other-side holder when splitting the magnets, so that the troubles in magnet splitting as described above can be prevented. In this respect, too, the split surfaces can be formed precisely, and dimensional accuracy of the split magnets can be improved.

Further, in the magnet splitting method described above, preferably, the pre-split magnet is in a form having a first main surface with the splitting grooves and a second main surface parallel thereto; in the magnet holding step, the one-side holder sandwiches the pre-split magnets by pressing a first one-side pressed region of the first main surface, the region extending along the splitting groove and including a first groove edge located on one side of the splitting groove and by pressing a second one-side pressed region of the second main surface, the region extending along and including a first groove edge corresponding portion that will appear on the second main surface when the first groove edge is projected in a direction orthogonal to the second main surface, and the other-side independent holding parts of the other-side holder sandwich the pre-split magnets by pressing a first other-side pressed region of the first main surface, the region extending along the splitting groove and including a second groove edge located on the other side of the splitting groove and by pressing a second other-side pressed region of the second main surface, the region extending along and including a second groove edge corresponding portion that will appear on the second main surface when the second groove edge is projected in a direction orthogonal to the second main surface; and the magnet splitting step is performed while this holding state is maintained.

According to the magnet splitting method described above, in the magnet holding step, the one-side holder sandwiches the pre-split magnets by pressing the first one-side pressed region of the first main surface, as well as the second one-side pressed region of the second main surface, while the other-side holder (other-side independent holding parts) sandwiches the pre-split magnets by pressing the first other-side pressed region of the first main surface, as well as the second other-side pressed region of the second main surface. Therefore, the pressing force exerted by the one-side holder and the other-side holder (other-side independent holding parts) is applied over to the first groove edge and the second groove edge of the splitting groove on the first main surface side, and to the first groove edge corresponding portion and the second groove edge corresponding portion on the second main surface side. In the magnet splitting step, consequently, troubles such as splitting cracks deviating or bifurcating, split surfaces being inclined, or split magnets being chipped, can be prevented. Therefore, the split surfaces can be formed precisely, and dimensional accuracy of the split magnets can further be improved.

Further, in the magnet splitting method described above, preferably, the pre-split magnet has a rectangular parallelepiped shape with a third side face and a fourth side face connecting the first main surface and the second main surface and parallel to each other, and a fifth side face and a sixth side face parallel to each other, with the splitting grooves each being orthogonal to the third side face and the fourth side face; in the magnet holding step, the first one-side holding part presses the first one-side pressed region excluding a first corner portion made between the first main surface and the third side face and a second corner portion made between the first main surface and the fourth side face, and the other-side independent holding parts of the other-side holder press the first other-side pressed region excluding the first corner portion and the second corner portion; and the magnet splitting step is performed while this holding state is maintained.

The pre-split magnet is in a rectangular parallelepiped shape with the first corner portion and the second corner portion as described above. In this case, according to the magnet splitting method described above, in the magnet holding step, the first one-side holding part presses the first one-side pressed region of the first main surface excluding the first corner portion and the second corner portion, while the other-side holder (other-side independent holding parts) presses the first other-side pressed region of the first main surface excluding the first corner portion and the second corner portion. Therefore, no large stress is applied to the first corner portion and the second corner portion in the magnet splitting step. This prevents chipping due to splitting from occurring at the first corner portion and the second corner portion.

Further, according to the magnet splitting method described above, preferably, in the magnet holding step, the one-side holder presses the second one-side pressed region excluding a third corner portion made between the second main surface and the third side face and a fourth corner portion made between the second main surface and the fourth side face, and the other-side holder presses the second other-side pressed region excluding the third corner portion and the fourth corner portion; and the magnet splitting step is performed while this holding state is maintained.

The pre-split magnet is in a rectangular parallelepiped shape with the third corner portion and the fourth corner portion as described above. In this case, according to the magnet splitting method described above, in the magnet holding step, the one-side holder presses the second one-side pressed region of the second main surface excluding the third corner portion and the fourth corner portion, while the other-side holder (other-side independent holding parts) presses the second other-side pressed region of the second main surface excluding the third corner portion and the fourth corner portion. Therefore, no large stress is applied to the third corner portion and the fourth corner portion in the magnet splitting step. This prevents chipping due to splitting from occurring at the third corner portion and the fourth corner portion.

Figure 1:
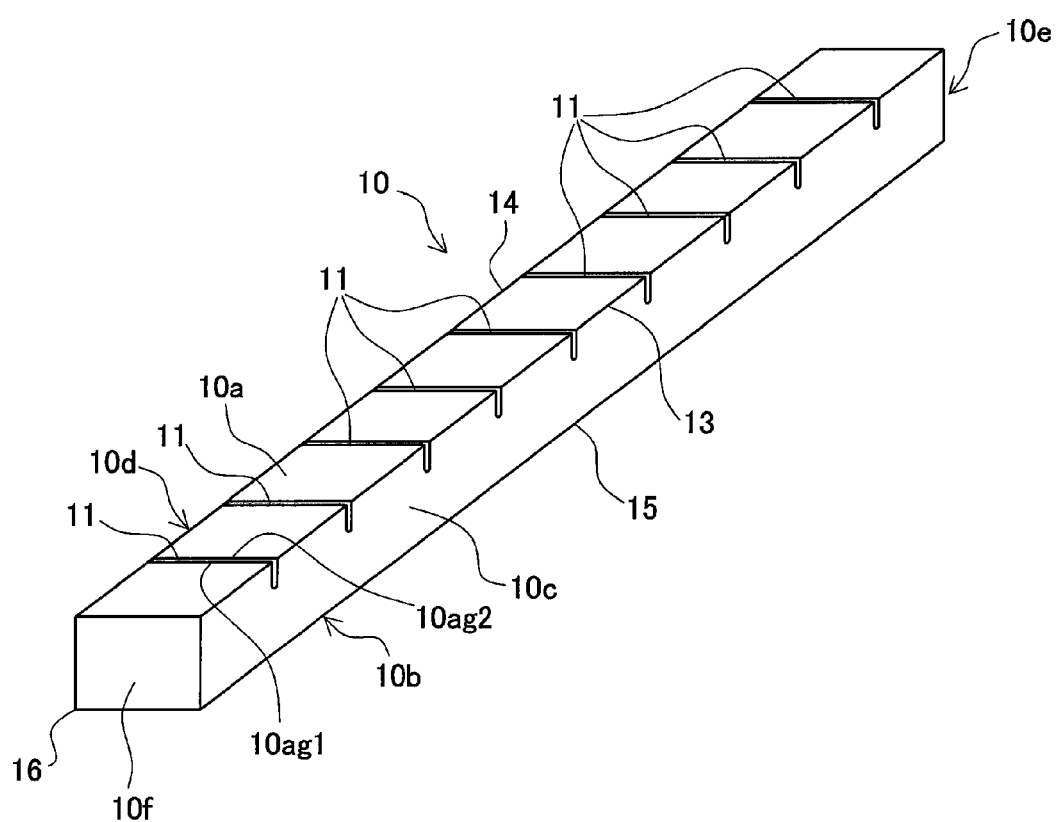
FIG. 1 is a perspective view of a pre-split magnet in Embodiment 1.

DESCRIPTION OF THE REFERENCE SIGNS 10, 30 Pre-split magnet
10a, 30a First main surface
10b Second main surface
11, 31 Splitting groove
11i, 31i Opening
11j, 31j Bottom part
20 Split magnet
20e First split surface
20f Second split surface
100, 200, 300 Magnet splitting device
110, 310 One-side holder
113, 313 First one-side holding part
123 Second one-side holding part
130, 230, 330 Other-side holder
131, 231, 331 Other-side independent holding part
133, 233, 333 First other-side independent holding portion
134, 334 First other-side independent pressing portion
136 Holder resilient member
236 Holding hydraulic cylinder
143 Second other-side independent holding portion
150, 250 Actuating unit
151 Independent actuating part (Actuating resilient member)
251 Independent actuating part (Actuating hydraulic cylinder)
153, 253 Simultaneous operating part

MODE FOR CARRYING OUT THE INVENTION (Embodiment 1)

Figure 2:
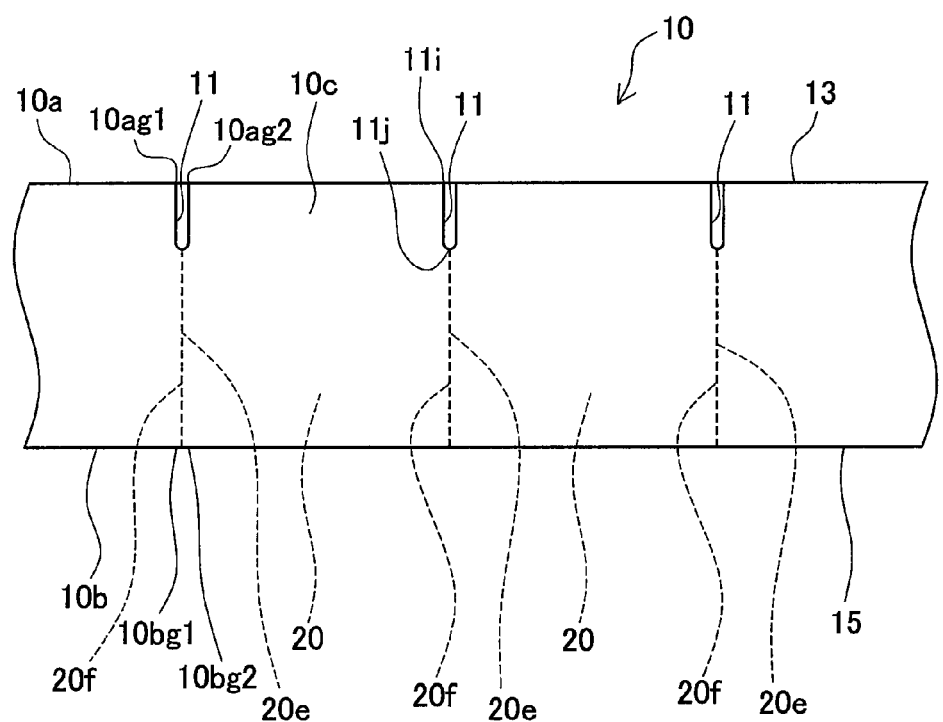
FIG. 2 is an enlarged side view of the pre-split magnet in Embodiment 1.
Figure 3:
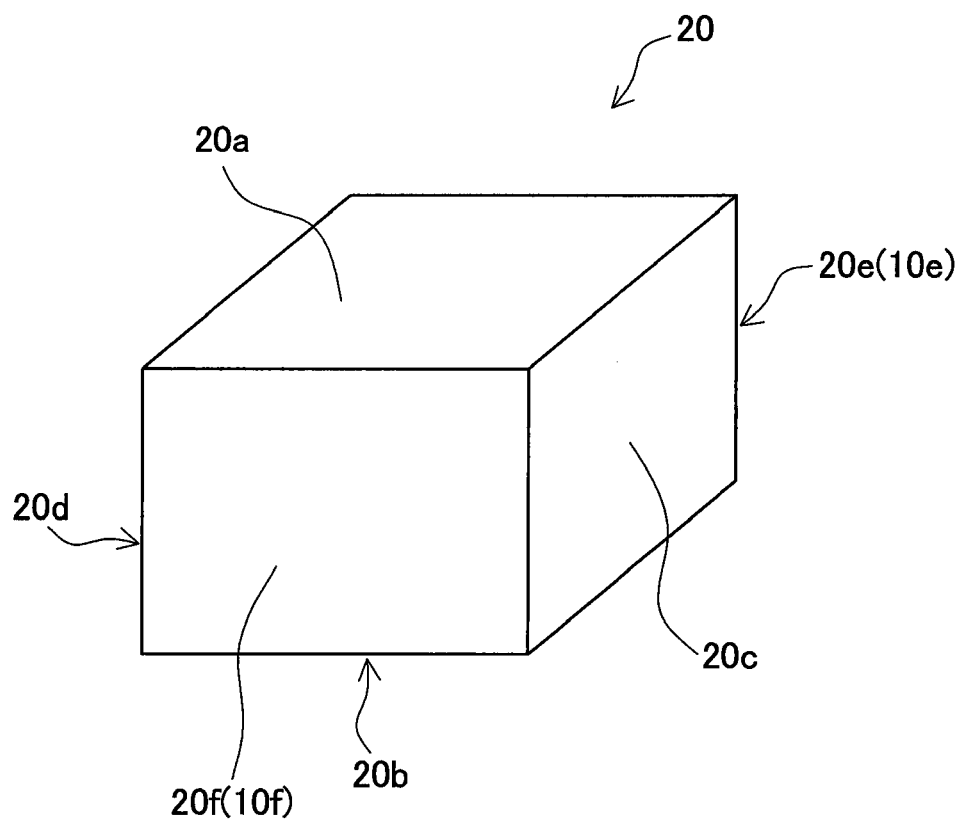
FIG. 3 is a perspective view of a split magnet in Embodiment 1.
Figure 4:
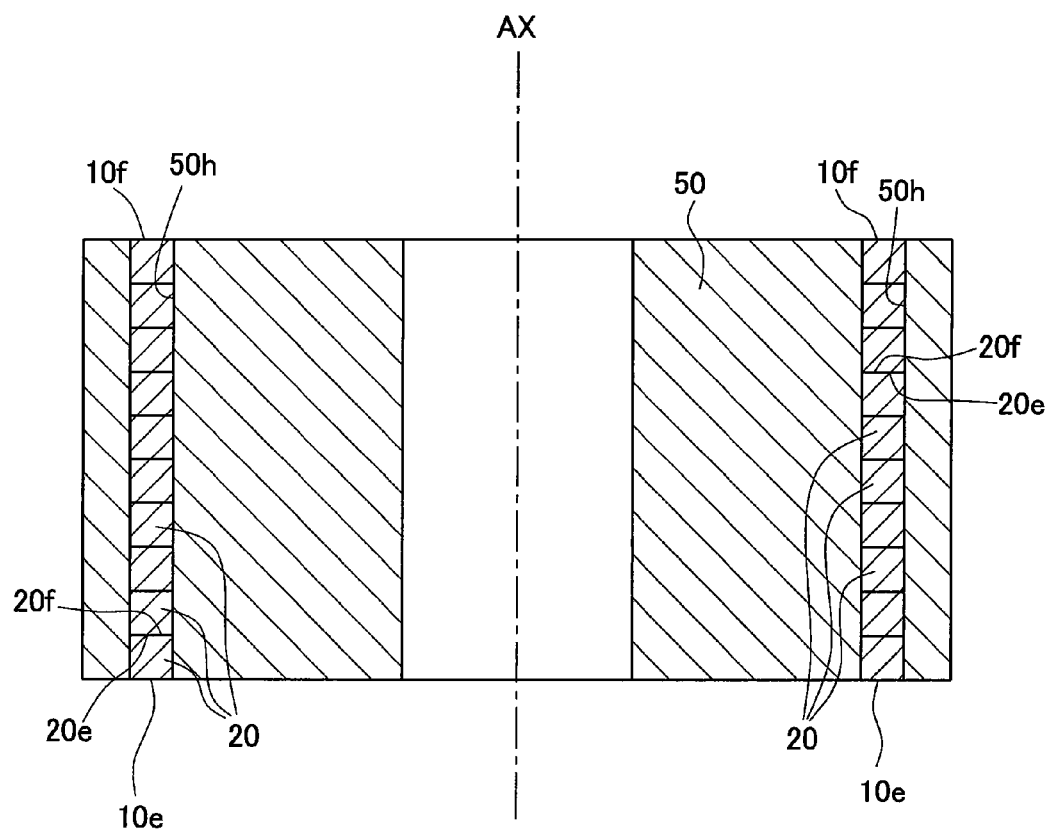
FIG. 4 is a longitudinal sectional view of a rotor forming a motor in Embodiment 1, showing a state where a number of split magnets are inserted in insertion holes.

Hereinafter, embodiments of the present invention will be described with reference to the drawings. FIGS. 1 and 2 show a pre-split magnet 10 used in Embodiment 1, and FIG. 3 shows a split magnet 20 obtained by splitting or dividing the pre-split magnet 10. FIG. 4 shows a rotor (motor member) 50 in which the split magnets 20 are used and which constitutes a motor (not shown). FIGS. 5 to 10 show a magnet splitting device 100 according to Embodiment 1.

The pre-split magnet 10 to be split apart in Embodiment 1 is a rare earth magnet made of a sintered metal material and it is not yet magnetized. This pre-split magnet 10 has a rectangular parallelepiped shape with a first main surface 10a, a second main surface 10b parallel thereto, and a third side face 10c, a fourth side face 10d, a fifth side face 10e, and a sixth side face 10f, which connect the main surfaces (see FIGS. 1 and 2). The third side face 10c and the fourth side face 10d are parallel to each other, and the fifth side face 10e and the sixth side face 10f are parallel to each other.

Of these, the first main surface 10a is formed with a plurality of splitting grooves 11 which will be the starting points when this pre-split magnet 10 is split apart (see FIGS. 1 and 2). These splitting grooves 11 are each formed in a substantially U-shaped cross section and to extend from the third side face 10c to the fourth side face 10d in parallel with the short side direction of the first main surface 10a and orthogonal to the third side face 10c and the fourth side face 10d. These splitting grooves 11 are spaced at regular intervals and in parallel to each other.

Splitting this pre-split magnet 10 along the splitting grooves 11 as the starting points produces a plurality of split magnets 20 (see FIG. 3). Each split magnet 20 has a rectangular parallelepiped shape with a first split main surface 20a corresponding to the first main surface 10a, a second split main surface 20b corresponding to the second main surface 10b, a third split side face 20c corresponding to the third side face 10c, a fourth split side face 20d corresponding to the fourth side face 10d, and two newly formed split surfaces, a first split surface 20e and a second split surface 20f, substantially parallel to each other. The split magnet 20 obtained from one end of the pre-split magnet 10 has the fifth side face 10e instead of the first split surface 20e, while the split magnet 20 obtained from the other end of the pre-split magnet 10 has the sixth side face 10f instead of the second split surface 20f.

These split magnets 20 are used in a motor (not shown). More specifically, more than one of these magnets are inserted in each of a plurality of magnet insertion holes 50h formed in the rotor 50 that forms the motor (see FIG. 4). The rotor 50 is cylindrical having an axis line AX. A number of split magnets 20 corresponding to one pre-split magnet 10 are inserted in each magnet insertion hole 50h of the rotor 50. The split magnets 20 inserted in the magnet insertion hole 50h are aligned in the same order as they were before the pre-split magnet 10 was split apart. Adjacent split magnets 20 are bonded with adhesive to each other with their first split surface 20e and second split surface 20f that were connected before splitting adjoining each other. Inserting more than one of the split magnets 20 in each of the magnet insertion holes 50h of the rotor 50 can help reduce eddy loss in the motor using these magnets.

Figure 5:
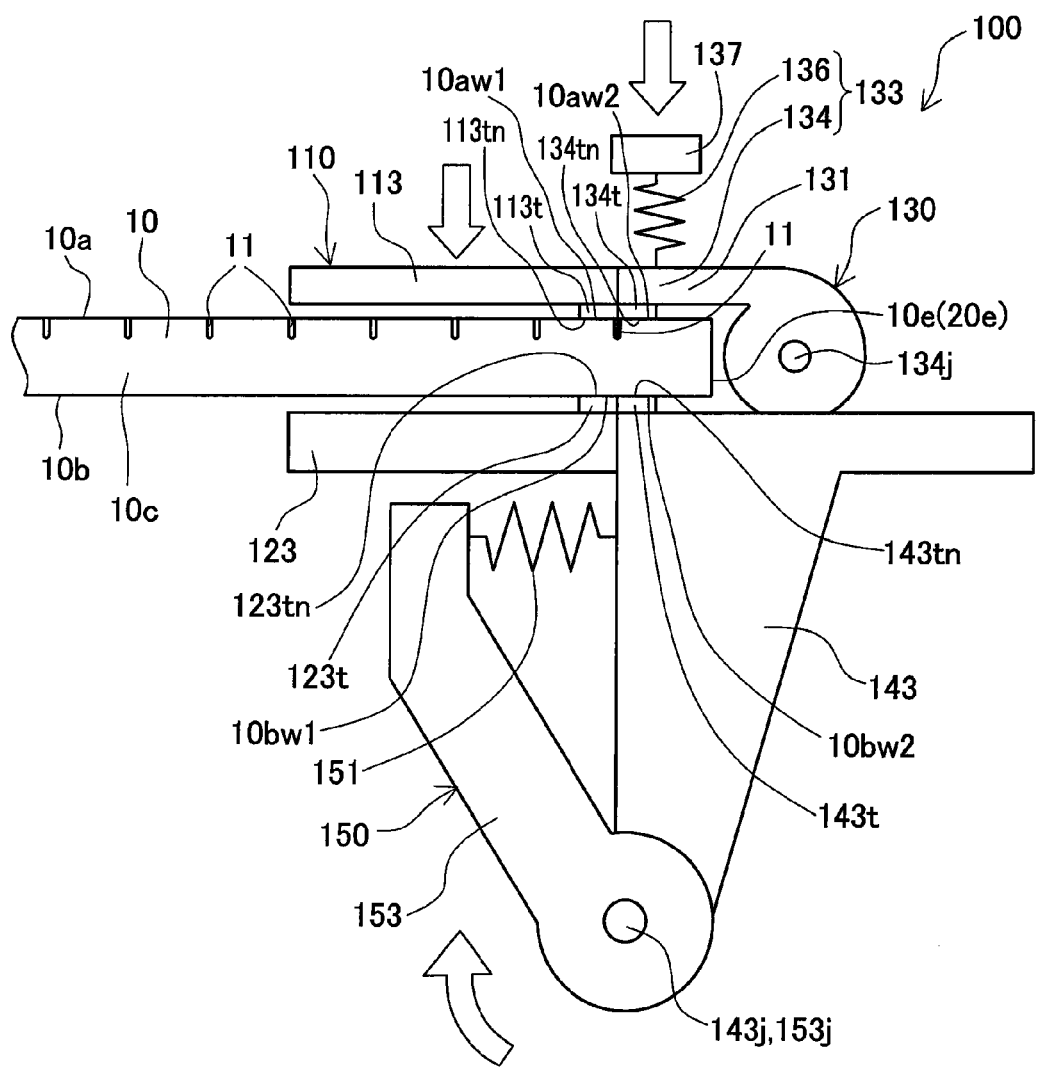
FIG. 5 is an explanatory view showing a magnet splitting device holding a pre-split magnet in Embodiment 1.
Figure 6:
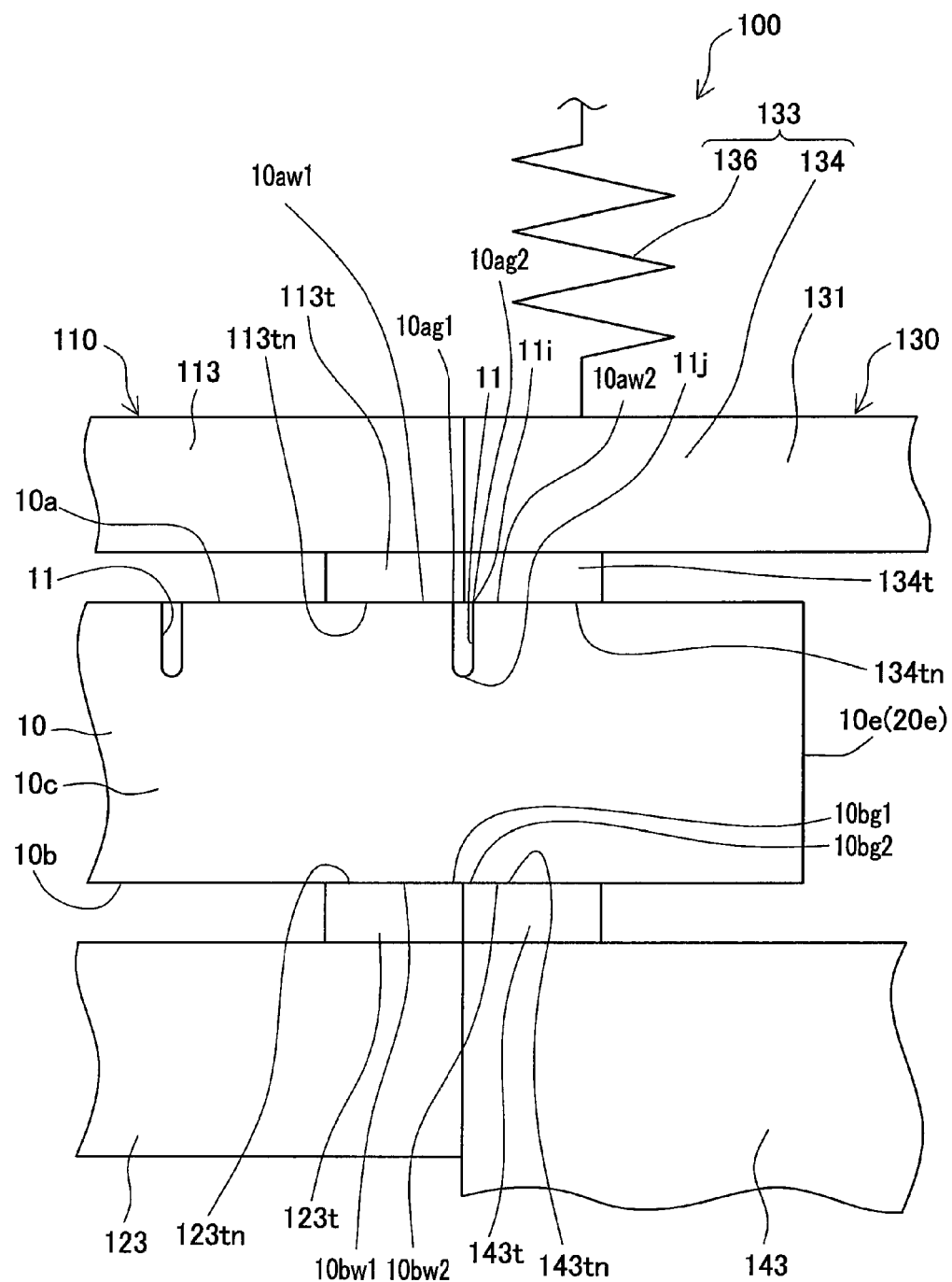
FIG. 6 is an explanatory view showing, in an enlarged view, that the pre-split magnet is held by the magnet splitting device in Embodiment 1.
Figure 7:
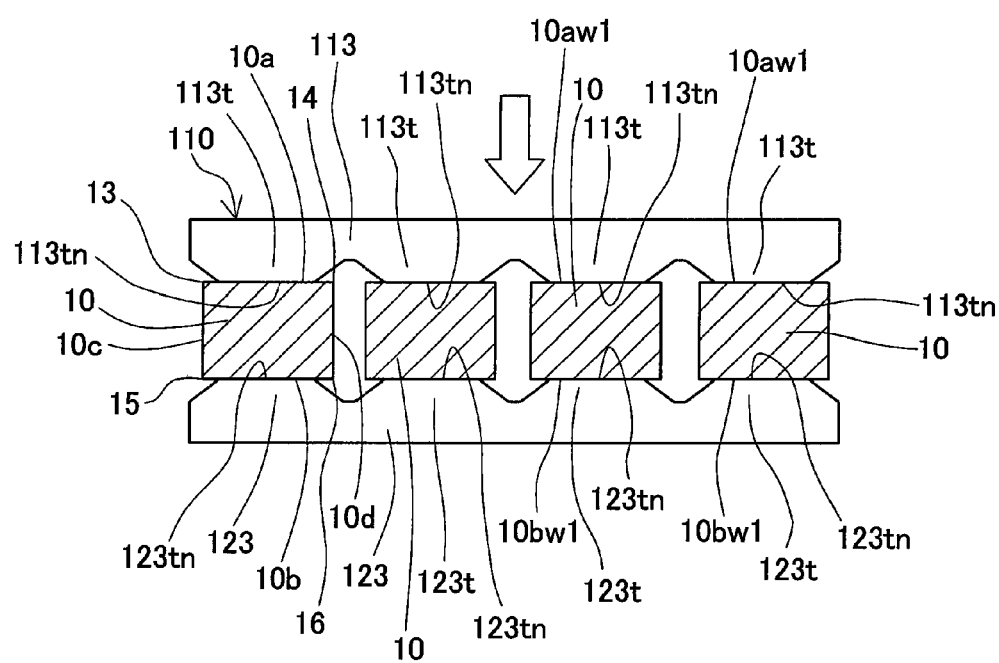
FIG. 7 is an explanatory view showing a state where the pre-split magnet is held by a one-side holder in Embodiment 1, seen from a right side in FIG. 5.
Figure 8:
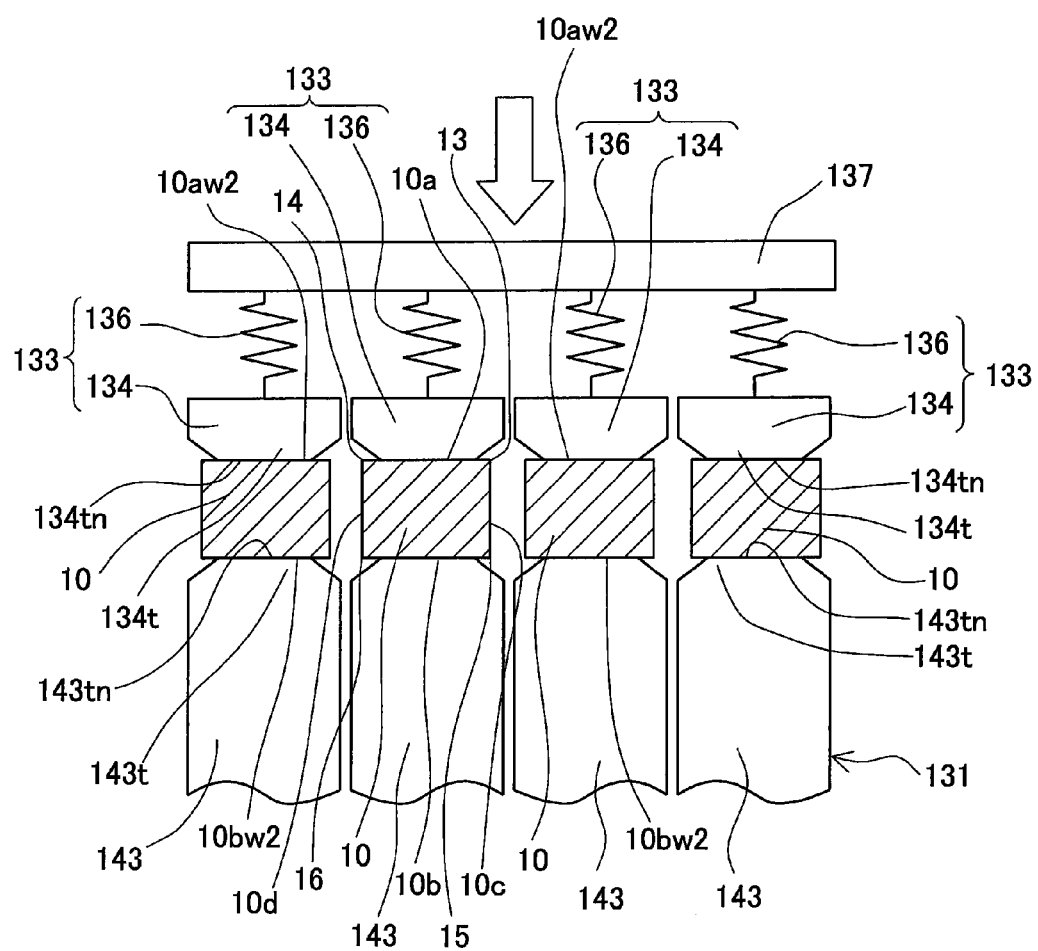
FIG. 8 is an explanatory view showing a state where the pre-split magnet is held by an other-side holder in Embodiment 1, seen from a left side in FIG. 5.
Figure 9:
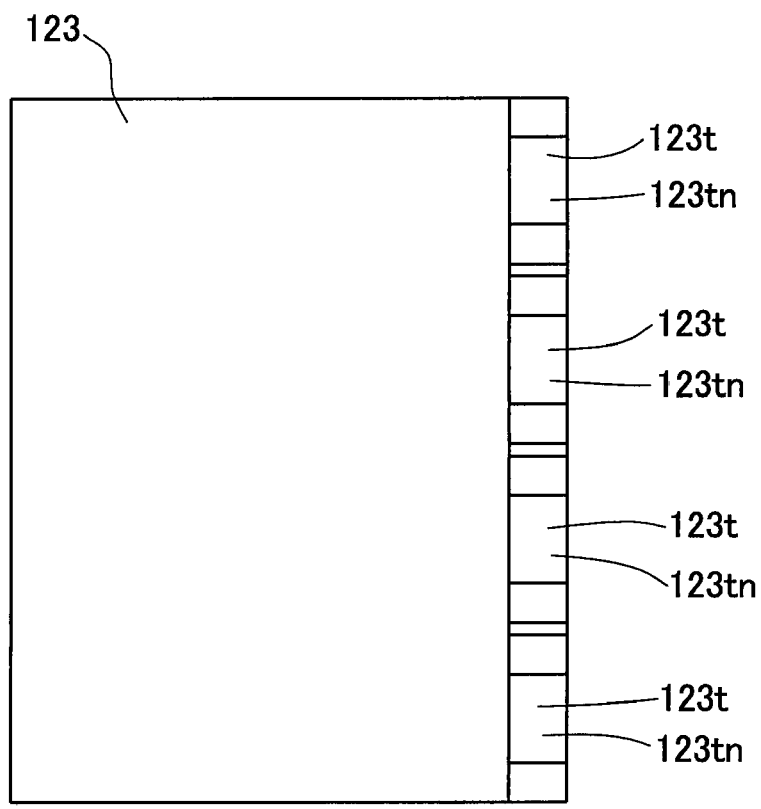
FIG. 9 is an explanatory view of a second one-side holding part in Embodiment, seen from an upper side in FIG. 5.
Figure 10:
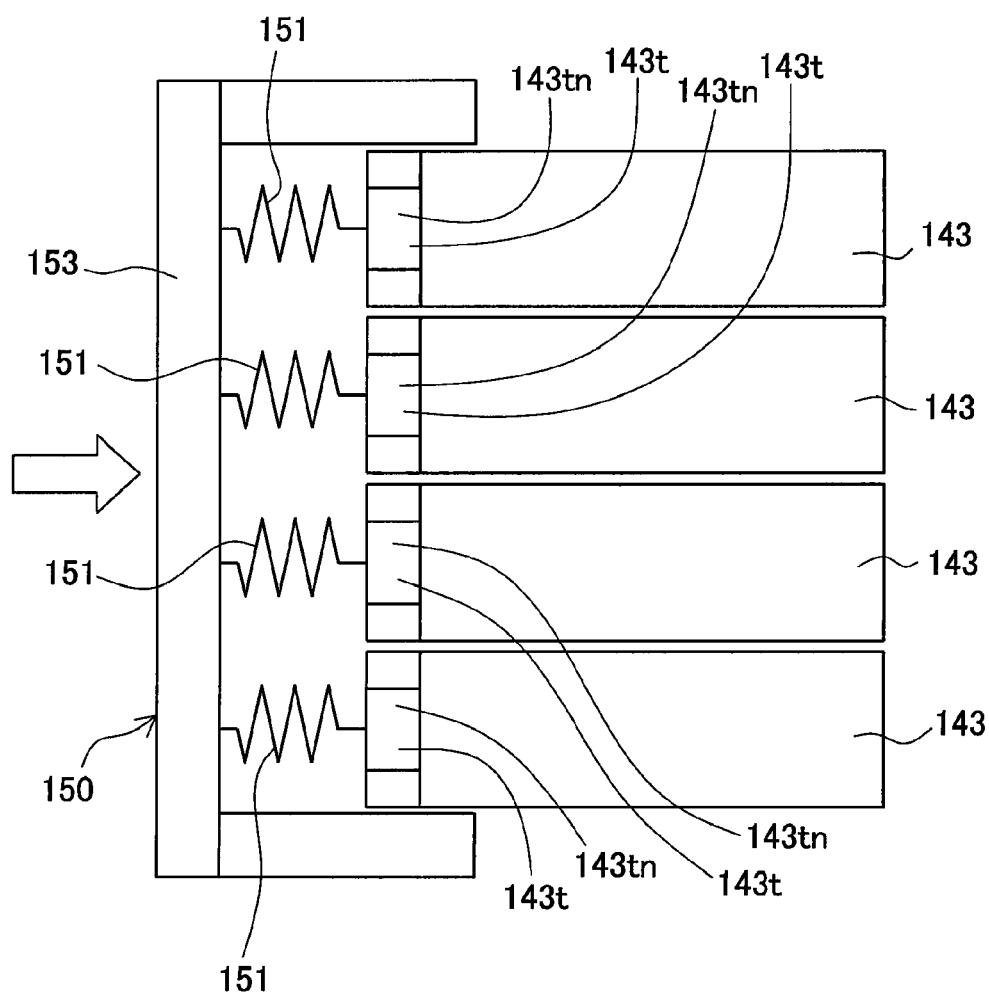
FIG. 10 is an explanatory view of second other-side independent holding portions and an actuating unit in Embodiment 1, seen from the upper side in FIG. 5.

Next, the magnet splitting device 100 according to Embodiment 1 will be described (FIGS. 5 to 10). FIG. 5 shows the entire magnet splitting device 100, and FIG. 6 is an enlarged view showing the vicinity of part of the magnet splitting device 100 where pre-split magnets 10 are held. FIG. 7 is a view seen from the right side of FIG. 5 showing how the pre-split magnets 10 are held with a one-side holder 110 which will be described later. FIG. 8 is a diagram viewed from the left side of FIG. 5 showing how the pre-split magnets 10 are held with an other-side holder 130 to be described later. FIG. 9 is a diagram of a second one-side holding part 123 which will be described later viewed from the upper side of FIG. 5. FIG. 10 is a view of second other-side independent holding portions 143 and an actuating unit 150 which will be described later seen from the upper side of FIG. 5.

This magnet splitting device 100 is configured to include the one-side holder 110, the other-side holder 130, and the actuating unit 150 so that a plurality of pre-split magnets 10 are held simultaneously and split apart all at once.

The one-side holder 110 includes a first one-side holding part 113 positioned in an upper part and a second one-side holding part 123 positioned lower than the former.

Of these, the first one-side holding part 113 includes a plurality of (four in Embodiment 1) first one-side pressing protrusions 113t each protruding downward and having a rectangular first one-side pressing surface 113tn at the distal end thereof (see FIGS. 5 to 7). This first one-side holding part 113 is arranged movably in the up and down direction so that when it holds a plurality of pre-split magnets 10, the first one-side pressing surfaces 113tn each contact the first main surface 10a of a corresponding pre-split magnet 10 from above and press the same downwards.

The second one-side holding part 123 includes a plurality of (four in Embodiment 1) second one-side pressing protrusions 123t each protruding upward and having a rectangular second one-side pressing surface 123tn of the same size as the first one-side pressing surface 113tn at the distal end thereof (see FIGS. 5 to 7 and 9). This second one-side holding part 123 is fixedly disposed at a predetermined position in the magnet splitting device 100 so that when it holds a plurality of pre-split magnets 10, the second one-side pressing surfaces 123tn each contact the second main surface 10b of a corresponding pre-split magnet 10 from below. The first one-side pressing protrusions 113t and the second one-side protrusions 123t are arranged at respective positions where their first one-side pressing surfaces 113tn and the second one-side pressing surfaces 123tn face each other.

The one-side holder 110 thus sandwiches and holds the pre-split magnets 10 between the first one-side holding part 113 and the second one-side holding part 123.

Next, the other-side holder 130 will be described. The other-side holder 130 includes a plurality of (four in Embodiment 1) other-side independent holding parts 131 independent from each other and a single holding base 137 to which the holding parts 131 are connected (see FIGS. 5, 6, and 8). Each of the other-side independent holding parts 131 includes a first other-side independent holding portion 133 positioned in an upper part and a second other-side independent holding portion 143 positioned lower than the former.

The first other-side independent holding portions 133 each include a first other-side independent pressing portion 134 and a holding resilient member 136 interposed between the pressing portion 134 and the holding base 137 for connecting them.

Each first other-side independent pressing portion 134 includes a first other-side pressing protrusion 134t protruding downward and having a rectangular first other-side pressing surface 134tn at the distal end thereof. The first other-side independent pressing portions 134 have a rotation axis 134j (see FIG. 5) and arranged rotatably around this rotation axis 134j as the center. The rotation axis 134j is arranged in a horizontal direction orthogonal to the up and down direction and parallel to the splitting grooves 11 of the pre-split magnets 10 when the pre-split magnets 10 are set in this magnet splitting device 100.

Each holding resilient member 136 is composed of a coil spring and attached to urge a corresponding first other-side independent pressing portion 134.

The holding base 137 of the other-side holder 130 is arranged movably in the up and down direction. When the other-side holder 130 holds a plurality of pre-split magnets 10, the holding base 137 moves downward, causing the holding resilient members 136 connected to the holding base 137 to urge their respective first other-side independent pressing portions 134 downward. The pressing surfaces 134tn of the first other-side independent pressing portions 134 each contact the first main surface 10a of a corresponding pre-split magnet 10 from above and press the same downward.

Each second other-side independent holding portions 143 includes a second other-side pressing protrusion 143t protruding upward and having a rectangular first other-side pressing surface 143tn of the same size as the second other-side pressing surface 134tn at the distal end thereof (see FIGS. 5, 6, 8, and 10). The second other-side pressing protrusions 143t are arranged at respective positions where their pressing surfaces 143tn face the pressing surfaces 134tn of the first other-side pressing protrusions 134t when holding the pre-split magnets 10.

The second other-side independent holding portions 143 have a rotation axis 143j (see FIG. 5) and arranged rotatably around this rotation axis 143j as the center. The rotation axis 143j is arranged in a horizontal direction orthogonal to the up and down direction and parallel to the splitting grooves 11 of the pre-split magnets 10 when the pre-split magnets 10 are set in this magnet splitting device 100. When the second other-side independent holding portions 143 hold the plurality of pre-split magnets 10, their second other-side pressing surfaces 143tn each contact the second main surface 10b of a corresponding pre-split magnet 10 from below.

The other-side holder 130 thus includes a plurality of other-side independent holding parts 131 configured to move (rotate) independently from each other. These holding parts 131 independently sandwich pre-split magnets 10 between the first holding portions 133 and the second holding portions 143 and hold them in a resilient manner by means of the holding resilient members 136.

Next, the actuating unit 150 will be described. The actuating unit 150 is configured to generate the movement (rotation) described above in the other-side holder 130. More specifically, the actuating unit 150 includes a plurality of (four in Embodiment 1) independent actuating parts 151 independent from each other, and a single simultaneous operating part 153 connected to these independent actuating parts 151 (see FIGS. 5 and 10).

Each independent actuating part 151 is comprised of an actuating resilient member, more specifically, a coil spring, interposed between the simultaneous operating part 153 and a corresponding second other-side independent holding portion 143 and connected thereto.

The simultaneous operating part 153 has a rotation axis 153j (see FIG. 5), and arranged movably (rotatably) around this rotation axis 153j as the center. This rotation axis 153j is the same as the rotation axis 143j of the second other-side independent holding portions 143.

When splitting the pre-split magnets 10, the simultaneous operating part 153 is rotated clockwise in FIG. 5 around the rotation axis 153j, whereby the independent actuating parts (actuating resilient members) 151 connected thereto operate at the same time. Namely, the independent actuating parts (actuating resilient members) 151 each urge the second other-side independent holding portion 143 of a corresponding other-side independent holding part 131 approximately in a horizontal direction, i.e., to the right side in FIG. 5.

Accordingly, the other-side independent holding parts 131 rotate clockwise in FIG. 5 around the rotation axis 143j respectively while the other-side independent holding parts 131 maintains the state of holding the pre-split magnets 10. Meanwhile, the one-side holder 110 does not move, so that this rotation of the other-side holder 130 (movement relative to the one-side holder 110) widens the openings 111 of the splitting grooves 11 more than the bottom parts 11j, as a result of which the respective pre-split magnets 10 are split apart along the splitting grooves 11 as the starting points.

Next, splitting of the pre-split magnets 10 by this magnet splitting device 100 will be described more specifically. A plurality of (four in Embodiment 1) pre-split magnets 10 are set in this magnet splitting device 100. Namely, the one-side holder 110 holds one side (left side in FIGS. 5 and 6) of a splitting groove 11 of each pre-split magnet 10, while the other-side holder 130 holds the other side (right side in FIGS. 5 and 6) of the splitting groove 11 of each pre-split magnet 10 (this corresponding to the above-described magnet holding step). More specifically, for each pre-split magnet 10, a portion corresponding to one split magnet 20 located at one end on the side of the fifth side face 10e is held by the other-side holder 130, and the remaining portion on one side of the splitting groove 11 located nearest to the fifth side face 10e is held by the one-side holder 110.

At this time, the pressing surfaces 113tn of the pressing protrusions 113t provided to the first one-side holding part 113 of the one-side holder 110 each contact the first main surface 10a of a corresponding pre-split magnet 10 and press the same downward (see FIGS. 5 to 7). The first one-side pressing surfaces 113tn each press a strip-shaped first one-side pressed region 10aw1 of a corresponding first main surface 10a, the region extending along the splitting groove 11 and including a first groove edge 10ag1 positioned on one side (left side in FIGS. 5 and 6) of both edges of the splitting groove 11.

This first one-side pressed region 10aw1 does not include a first corner portion 13 made between the first main surface 10a and the third side face 10c, and a second corner portion 14 made between the first main surface 10a and the fourth side face 10d, of the pre-split magnet 10. Therefore, the first one-side pressing surfaces 113tn of the first one-side holding part 113 each press the first one-side pressed region 10aw1 of a corresponding first main surface 10a, not including the first corner portion 13 and the second corner portion 14 (see FIGS. 1 and 7).

On the other hand, the pressing surfaces 123tn of the pressing protrusions 123t of the second one-side holding part 123 of the one-side holder 110 each contact the second main surface 10b of a corresponding pre-split magnet 10 and press the same upward (see FIGS. 5 to 7). The second one-side pressing surfaces 123tn each press a strip-shaped second one-side pressed region 10bw1 of a corresponding second main surface 10b, the region extending along and including a first groove edge corresponding portion 10bg1 that will appear on the second main surface 10b if the first groove edge 10ag1 is projected in a direction orthogonal to the second main surface 10b.

This second one-side pressed region 10bw1 does not include a third corner portion 15 made between the second main surface 10b and the third side face 10c, and a fourth corner portion 16 made between the second main surface 10b and the fourth side face 10d, of the pre-split magnet 10. Therefore, the second one-side pressing surfaces 123tn of the second one-side holding part 123 each press the second one-side pressed region 10bw1 of a corresponding second main surface 10b, not including the third corner portion 15 and the fourth corner portion 16 (see FIGS. 1 and 7).

The plurality of pre-split magnets 10 are thus held by the one-side holder 110, with the first one-side holding part 113 and the second one-side holding part 123 sandwiching the pre-split magnets 10 therebetween.

Turning now to the other-side holder 130, the pressing surfaces 134tn of the pressing protrusions 134t of the first other-side independent pressing portions 134 included in the first other-side independent holding portions 133 of the other-side independent holding parts 131 of the other-side holder 130 each contact the first main surface 10a of a corresponding pre-split magnet 10 and press the same downward (see FIGS. 5, 6, and 8).

More specifically, the first other-side pressing surfaces 134tn each press the first main surface 10a of a corresponding pre-split magnet 10 by means of the resilient force of the holding resilient members 136 connected to the first other-side independent pressing portions 134. The first other-side pressing surfaces 134tn each press a strip-shaped first other-side pressed region 10aw2 of a corresponding first main surface 10a, the region extending along the splitting groove 11 and including a second groove edge 10ag2 positioned on the other side (right side in FIGS. 5 and 6) of both edges of the splitting groove 11.

Each of the first other-side pressed regions 10aw2 does not include the first corner portion 13 and the second corner portion 14 mentioned above. Therefore, the pressing surfaces 134tn of the first other-side independent holding portions 133 each press the first other-side pressed region 10aw2 of a corresponding first main surface 10a, not including the first corner portion 13 and the second corner portion 14 (see FIGS. 1 and 8).

On the other hand, the pressing surfaces 143tn of the second other-side pressing protrusions 143t included in the second other-side independent holding portions 143 of the other-side independent holding parts 131 of the other-side holder 130 each contact the second main surface 10b of a corresponding pre-split magnet 10 and press the same upward (see FIGS. 5, 6, and 8). The second other-side pressing surfaces 143tn each press a strip-shaped second other-side pressed region 10bw2 of a corresponding second main surface 10b, the region extending along and including a second groove edge corresponding portion 10bg2 that will appear on the second main surface 10b if the second groove edge 10ag2 is projected in a direction orthogonal to the second main surface 10b.

Each of the second other-side pressed regions 10bw2 does not include the third corner portion 15 and the fourth corner portion 16 mentioned above. Therefore, the pressing surfaces 143tn of the second other-side independent holding portions 143 each press the second other-side pressed region 10bw2 of a corresponding second main surface 10b, not including the third corner portion 15 and the fourth corner portion 16 (see FIGS. 1 and 8).

The plurality of pre-split magnets 10 are thus held by the other-side holder 130, with the first other-side independent holding portions 133 and the second other-side independent holding portions 143 sandwiching the plurality of respective pre-split magnets 10 therebetween independently from each other.

Figure 11:
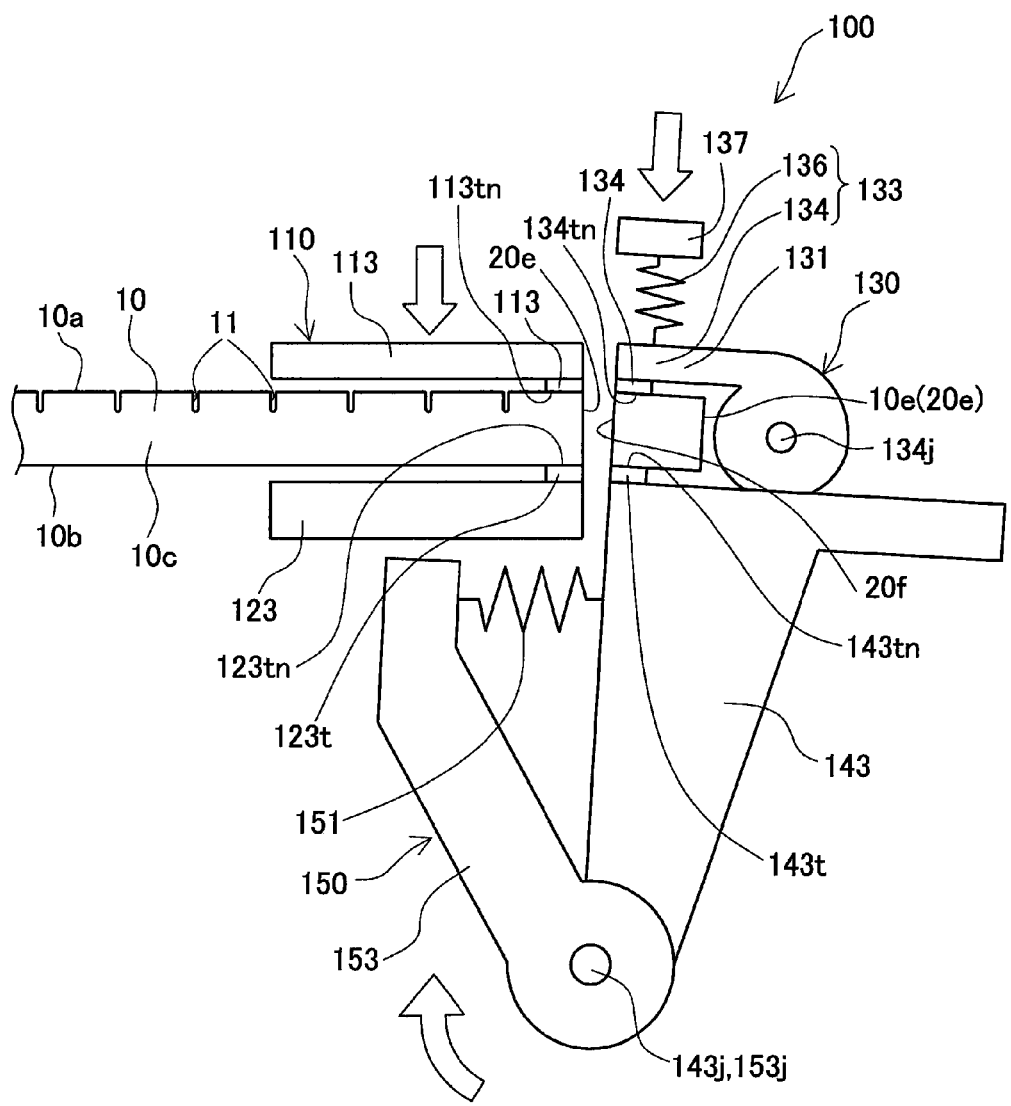
FIG. 11 is an explanatory view showing a state where the pre-split magnet is split by the magnet splitting device in Embodiment 1.

Once the pre-split magnets 10 are simultaneously held with the one-side holder 110 and the other-side holder 130, the pre-split magnets 10 are split apart all at once along the splitting grooves 11 as the starting points by means of relative movement of the other-side holder 130 relative to the one-side holder 110 as shown in FIG. 11 in such a manner as to widen the openings 11i of the splitting grooves 11 more than the bottom parts 11j (see FIG. 6) (this corresponding to the above-described magnet splitting step).

More specifically, the simultaneous operating part 153 of the actuating unit 150 is rotated clockwise in FIG. 11 around the rotation axis 153j thereof, so as to urge the other-side holder 130 by the independent actuating parts (actuating resilient members) 151 of the actuating unit 150 and to rotate the other-side holder 130 clockwise in FIG. 11 around the rotation axis 143*j*.

When the simultaneous operating part 153 rotates clockwise in FIG. 11, the plurality of independent actuating parts 151 connected thereto move, too. These actuating parts 151 each urge a corresponding second other-side independent holding portion 143 of the other-side holder 130 with their resilient force approximately in a horizontal direction. Thereby, the second other-side independent holding portions 143 each rotate around the rotation axis 143*j* with the first other-side independent holding portions 133 and others.

Meanwhile, the one-side holder 110 does not move, so that this rotation of the other-side holder 130 (relative movement relative to the one-side holder 110) widens the openings 11*i* of respective splitting grooves 11 of the pre-split magnets 10 more than the bottom parts 11*j*, as a result of which the pre-split magnets 10 are split apart along the splitting grooves 11 as the starting points. Thus separate split magnets 20 are obtained.

After that, the other-side holder 130 is released from a holding state and then the split magnets 20 are taken out. The one-side holder 110 is also released from a holding state and then the remaining pre-split magnets 10 are moved rightward in FIGS. 5 and 11 toward the other-side holder 130 by the length corresponding to one split magnet 20. After that, the remaining pre-split magnets 10 are held again by the one-side holder 110 and the other-side holder 130 as described above (magnet holding step) and split apart (magnet splitting step). This is repeated until the entire pre-split magnet 10 is completely divided into discrete split magnets 20.

As described above, with the magnet splitting device 100 of Embodiment 1, a plurality of pre-split magnets 10 are simultaneously held by the one-side holder 110 and the other-side holder 130 (magnet holding step) and split apart all at once (magnet splitting step). Therefore, productivity of split magnets 20 can be improved.

In addition, the other-side holder 130 holds the pre-split magnets 10 independently from each other and respectively with the other-side independent holding parts 131 in the magnet holding step. Therefore, the pre-split magnets 10 can be respectively appropriately held even if there are dimensional variations between these pre-split magnets 10. Slippage is thereby prevented from occurring between the pre-split magnets 10 and the other-side holder 130 in the magnet splitting step, so that troubles such as splitting cracks deviating or bifurcating, the first and second split surfaces 20*e* and 20*f* being inclined, or split magnets 20 being chipped, can be prevented. Therefore, the first and second split surfaces 20*e* and 20*f* can be formed precisely, and dimensional accuracy of the split magnets 20 can be improved.

Since the other-side holder 130 includes the plurality of other-side independent holding parts 131 and the actuating unit 150 includes the plurality of independent actuating parts 151, the pre-split magnets 10 can be subjected respectively to a splitting load and split apart independently from each other in the magnet splitting step. Even if these pre-split magnets 10 are split apart at different timings due to variations in strength between these pre-split magnets 10, pre-split magnets 10 split apart later can be prevented from being subjected to a sudden, large splitting load. Slippage is thereby prevented from occurring between the pre-split magnets 10 and the one-side holder 110 and between the pre-split magnets 10 and the other-side holder 130 when splitting the magnets, so that the troubles in magnet splitting as described above can be prevented. In this respect, too, the first and second split surfaces 20*e* and 20*f* can be formed precisely, and dimensional accuracy of the split magnets 20 can be improved.

Furthermore, in Embodiment 1, the simultaneous operating part 153 is formed to be movable itself. The independent actuating parts 151 are actuating resilient members, each interposed between the simultaneous operating part 153 and a corresponding other-side independent holding part 131, so that the corresponding other-side independent holding part 131 is urged in a direction in which the above-described relative movement is generated by the movement of the simultaneous operating part 153. Thus, while having a simple structure, the actuating unit 150 can generate the above-described relative movement simultaneously and independently in the plurality of other-side independent holding parts 131.

In Embodiment 1, moreover, the plurality of other-side independent holding parts 131 each include a holding resilient member 136 resiliently holding the other side of a corresponding pre-split magnet 10. Therefore, while having a simple structure, the other-side independent holding parts 131 can hold the plurality of respective pre-split magnets 10 appropriately and independently.

In Embodiment 1, of the one-side holder 110, the first one-side holding part 113 presses the first one-side pressed regions 10*aw*1 of the first main surfaces 10*a*, while the second one-side holding part 123 presses the second one-side pressed regions 10*bw*1 of the second main surfaces 10*b*. Of the other-side independent holding parts 131, the first other-side independent holding portions 133 press the first other-side pressed regions 10*aw*2 of the first main surfaces 10*a*, while the second other-side independent holding portions 143 press the second other-side pressed regions 10*bw*2 of the second main surfaces 10*b*.

Therefore, the pressing force exerted by the one-side holder 110 and the other-side holder 130 (other-side independent holding parts 131) is applied to the first one-side pressed regions 10*aw*1 and the first other-side pressed regions 10*aw*2 on the first main surface 10*a* side, i.e., applied over to the first groove edges 11*ag*1 and the second groove edges 11*ag*2 of the splitting grooves 11. The above-described pressing force is applied to the second one-side pressed regions 10*bw*1 and second other-side pressed regions 10*bw*2 on the second main surface 10*b* side, i.e., applied over to the first groove edge corresponding portions 11*bg*1 and the second groove edge corresponding portions 11*bg*2. Thereby, troubles in splitting the magnets such as splitting cracks deviating or bifurcating, the first and second split surfaces 20*e* and 20*f* being inclined, or split magnets 20 being chipped, can be prevented. Therefore, the first and second split surfaces 20*e* and 20*f* can be formed precisely, and dimensional accuracy of the split magnets 20 can further be improved.

In Embodiment 1, moreover, when holding the pre-split magnets 10, the first one-side holding part 113 presses the first one-side pressed regions 10*aw*1 of the first main surfaces 10*a*, not including the first corner portions 13 and the second corner portions 14, while the first other-side independent holding portions 133 press the first other-side pressed regions 10*aw*2 of the first main surfaces 10*a*, not including the first corner portions 13 and the second corner portions 14. Therefore, the first corner portions 13 and the second corner portions 14 are not subjected to large stress, so that they are prevented from being chipped when splitting the magnets.

Also, when holding the plurality of pre-split magnets 10, the second one-side holding part 123 presses the second one-side pressed regions 10*bw*1 of the second main surfaces 10*b*, not including the third corner portions 15 and the fourth corner portions 16, while the second other-side independent holding portions 143 press the second other-side pressed regions 10bw2 of the second main surfaces 10b, not including the third corner portions 15 and the fourth corner portions 16. Therefore, the third corner portions 15 and the fourth corner portions 16 are not subjected to large stress, so that they are prevented from being chipped when splitting the magnets.

(Embodiment 2)

Figure 12:
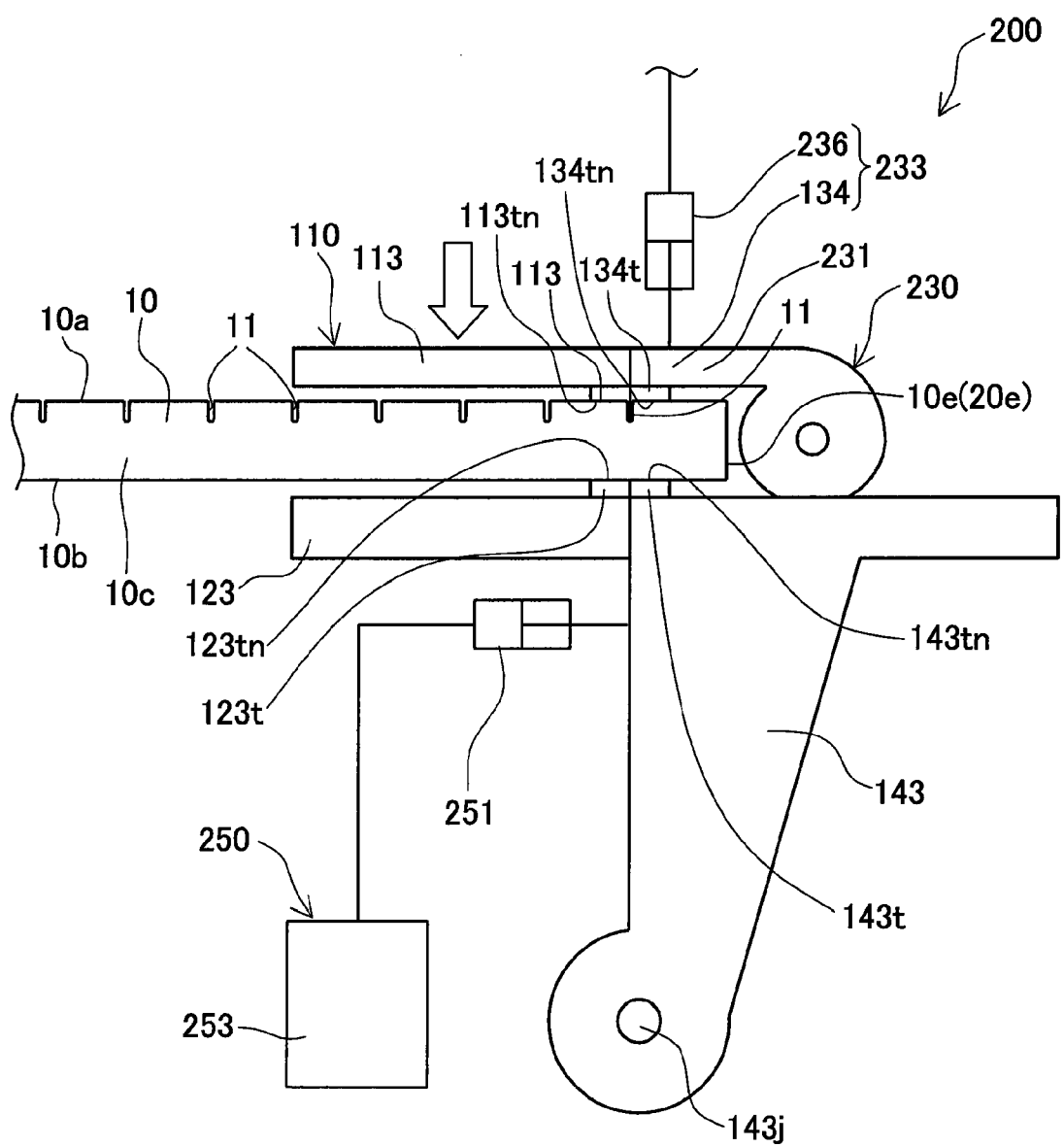
FIG. 12 is an explanatory view showing a magnet splitting device in Embodiment 2.
Figure 13:
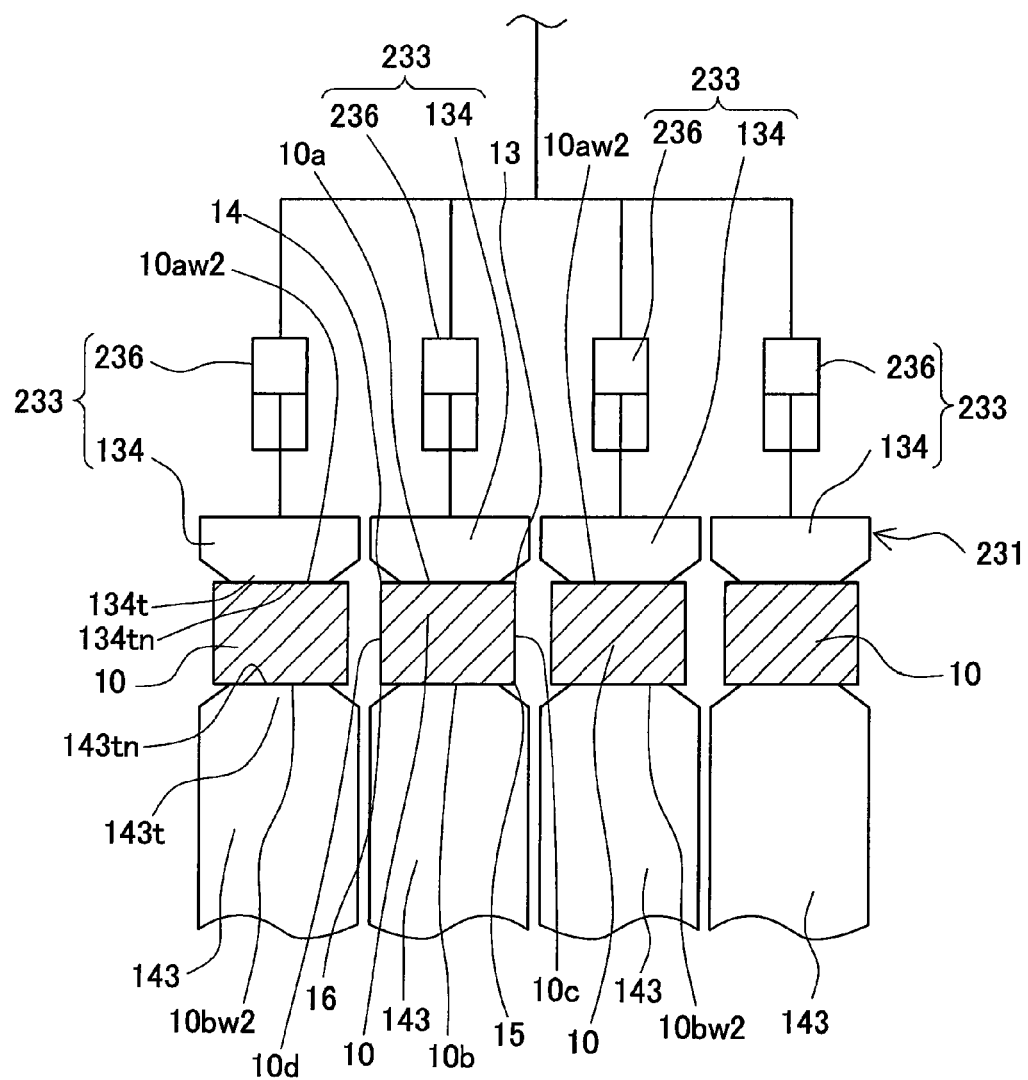
FIG. 13 is an explanatory view showing a state where a pre-split magnet is held by an other-side holder in Embodiment 2, seen from left side in FIG. 12.
Figure 14:
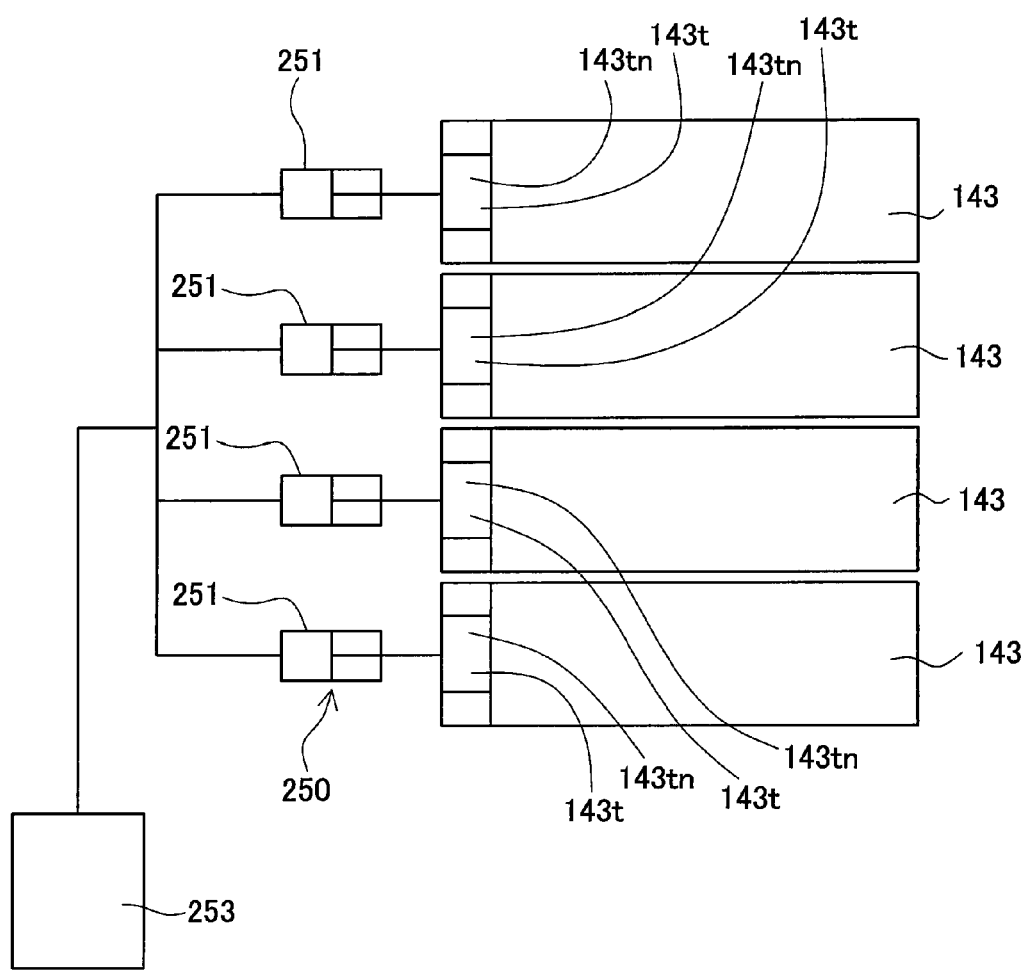
FIG. 14 is an explanatory view of a second other-side independent holding portion and an actuating unit in Embodiment 2, seen from top in FIG. 12.

Next, the second embodiment will be described. The magnet splitting device 200 of Embodiment 2 differs from the magnet splitting device 100 of Embodiment 1 described above in that other-side independent holding parts 231 each have a holding hydraulic cylinder 236, unlike the other-side independent holding parts 131 each having the holding resilient member 136. Also, the magnet splitting device 200 of Embodiment 2 differs from the magnet splitting device 100 of Embodiment 1 described above in that independent actuating parts 251 are respectively actuating hydraulic cylinders, unlike the independent actuating parts 151 being respectively actuating resilient members. Other features are basically similar to those of Embodiment 1 described above, and therefore description of parts similar to Embodiment 1 will be omitted or simplified. FIGS. 12 to 14 illustrate the magnet splitting device 200 of Embodiment 2. FIG. 12 is a view corresponding to FIG. 1 of Embodiment 1 described above, FIG. 13 is a view corresponding to FIG. 8 of Embodiment 1 described above, and FIG. 14 is a view corresponding to FIG. 10 of Embodiment 1 described above.

In Embodiment 2, an other-side holder 230 includes a plurality of (four) other-side independent holding parts 231. Each holding part 231 includes a first other-side independent holding portion 233 and a second other-side independent holding portion 143 that sandwich and hold a pre-split magnet 10. The second other-side independent holding portions 143 are similar to those of Embodiment 1 described above. The first other-side independent holding portions 233, on the other hand, each include a first other-side independent pressing portion 134 similar to that of Embodiment 1 described above and the holding hydraulic cylinder 236 mounted such as to be able to move this pressing portion 134 in the up and down direction.

When the other-side holder 230 holds a plurality of pre-split magnets 10, the hydraulic cylinders 236 each press a corresponding first other-side independent pressing portion 134 downward. The first other-side pressing surfaces 134tn of the first other-side independent pressing portions 134 each contact the first main surface 10a of a corresponding pre-split magnet 10 from above and press the same downward.

With this configuration, too, since the other-side holder 230 holds a plurality of pre-split magnets 10 respectively independently from each other, the pre-split magnets 10 can be respectively appropriately held even if there are dimensional variations between these pre-split magnets 10.

In Embodiment 2, an actuating unit 250 includes a plurality of (four) independent actuating parts 251 independent from each other, and a single simultaneous operating part 253 to which these independent actuating parts 251 are connected. The actuating parts 251 are each comprised of an actuating hydraulic cylinder and connected to the respective second other-side independent holding portions 143. The simultaneous operating part 253 is a hydraulic pressure supplying device comprised of piping, pumps, etc. so as to be able to simultaneously supply oil to the independent actuating parts (actuating hydraulic cylinders) 251 respectively.

When splitting a plurality of pre-split magnets 10, the simultaneous operating part 253 operates the independent actuating parts (actuating hydraulic cylinders) 251 simultaneously to each press the second other-side independent holding portion 143 of a corresponding other-side independent holding part 231 approximately in a horizontal direction, i.e., to the right side in FIG. 12. The other-side independent holding parts 231 then each rotate clockwise in FIG. 12 around the rotation axis 143j as the center while maintaining the state in which the pre-split magnets 10 are held. The plurality of pre-split magnets 10 are then split apart simultaneously.

With this configuration, too, since the actuating unit 250 presses the other-side independent holding parts 231 independently to apply a splitting load respectively independently to the pre-split magnets 10, these pre-split magnets 10 can be split apart independently from each other. Other features similar to Embodiment 1 described above provide similar advantageous effects as those of Embodiment 1.

(Embodiment 3)

Figure 15:
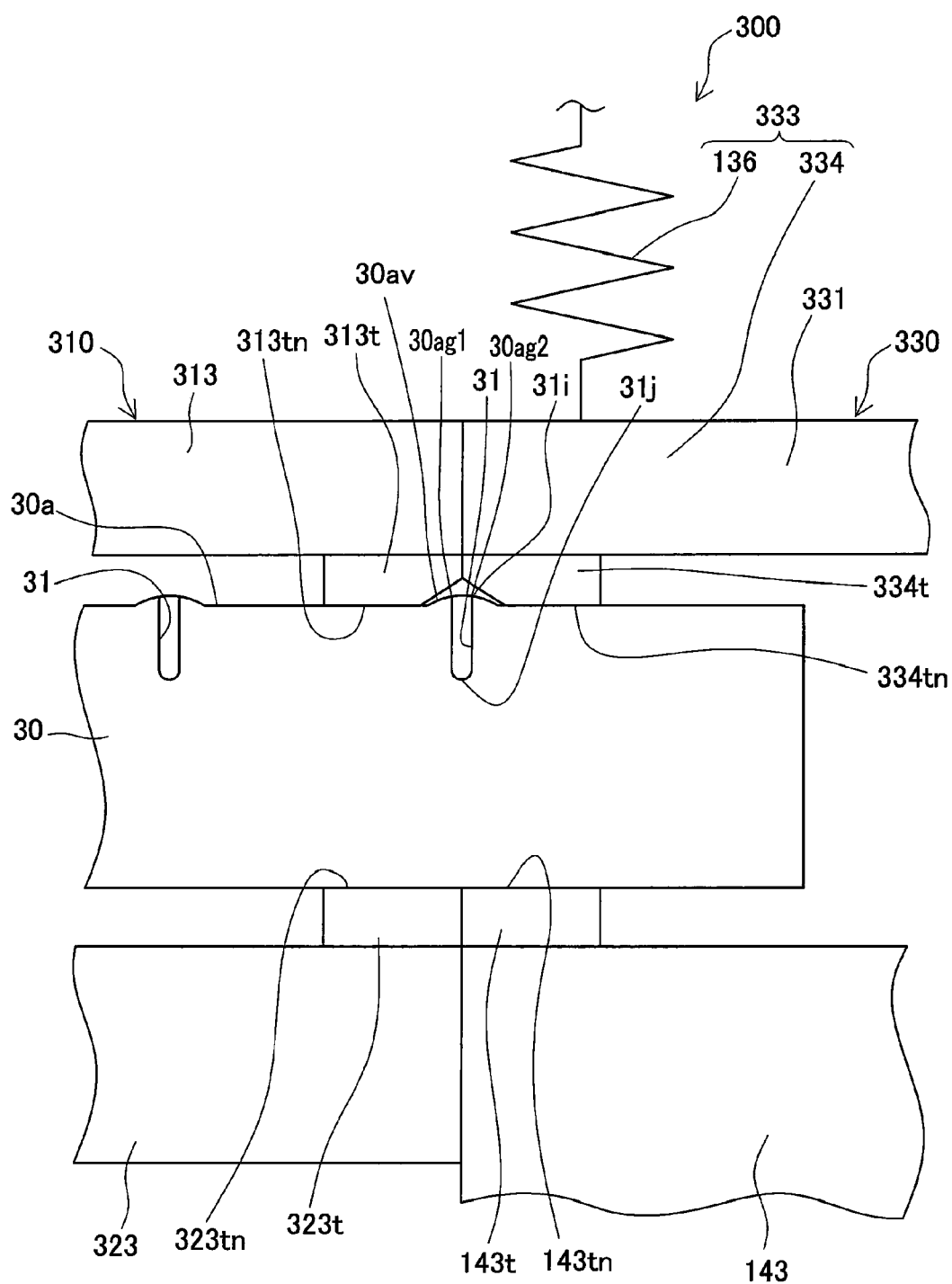
FIG. 15 is an explanatory view showing in an enlarged form a state where a pre-split magnet is held by a magnet splitting device in Embodiment 3.

Next, the third embodiment will be described. A magnet splitting device 300 of Embodiment 3 differs from Embodiment 1 described above in that first one-side pressing protrusions 313t of a first one-side holding part 313 of a one-side holder 310 have a different configuration. Also, first other-side pressing protrusions 334t of first other-side independent holding portions 333 included in other-side independent holding parts 331 of an other-side holder 330 have a different configuration from that of Embodiment 1 described above. Other features are basically similar to those of Embodiment 1 described above, and therefore description of parts similar to Embodiment 1 will be omitted or simplified. FIG. 15 shows essential parts of the magnet splitting device 300 of Embodiment 3. This FIG. 15 is a view corresponding to FIG. 6 of Embodiment 1 described above.

First, a pre-split magnet 30 to be split apart with the magnet splitting device 300 of Embodiment 3 will be described. This pre-split magnet 30 has a rectangular parallelepiped shape generally similar to the pre-split magnet 10 used in Embodiment 1 described above, but with a slightly different shape near splitting grooves 31. Namely, each region 30av near a splitting groove 31 including both edges thereof (a first groove edge 30ag1 and a second groove edge 30ag2) in the first main surface 30a are somewhat bulged rather than flat. The regions 30av near the splitting grooves 31 may sometimes be bulged like this depending on the method for forming splitting grooves 31 in the pre-split magnet 30.

The magnet splitting device 300 of Embodiment 3 has the one-side holder 310, with first one-side pressing protrusions 313t of the first one-side holding part 313 having a different configuration from that of the first one-side pressing protrusions 113t of the first one-side holding part 113 in the one-side holder 110 of Embodiment 1 described above. Namely, the first one-side pressing protrusions 313t are partly chamfered so that the first one-side pressing surfaces 313tn thereof do not contact the regions 30av near the splitting grooves 31 in the first main surfaces 10a when the first one-side pressing protrusions 313t each press the first main surface 30a of a corresponding pre-split magnet 30.

With the first one-side pressing protrusions 313t having such a configuration, each of the pressing surfaces 313tn of the protrusions 313t can be prevented from making partial contact with a corresponding first main surface 30a, so that the pre-split magnets 30 can be held reliably with the one-side holder 310 and split apart. Chipping of the pre-split magnets 30 in the regions 30av near the splitting grooves 31 can also be prevented.

Also, in Embodiment 3, in the other-side independent holding parts 331 of the other-side holder 330, the pressing protrusions 334t of first other-side independent pressing portion 334 included in the first other-side independent holding portion 333 have a different configuration from that of the pressing protrusions 134t of the first other-side independent pressing portions 134 included in the first other-side independent holding portions 133 of the other-side independent holding parts 131 in the other-side holder 130 of Embodiment 1 described above. Namely, the first other-side pressing protrusions 334t are partly chamfered so that their pressing surfaces 334tn do not contact the regions 30av near the splitting grooves 31 in the first main surfaces 30a when the first other-side pressing protrusions 334t each press the first main surface 30a of a corresponding pre-split magnet 30.

With the first other-side pressing protrusions 334t having such a configuration, each of the pressing surfaces 334tn of the first other-side pressing protrusions 334t can be prevented from making partial contact with a corresponding first main surface 30a, so that the pre-split magnets 30 can be held reliably with the other-side holder 330 and split apart. Chipping of the pre-split magnets 30 in the regions 30av near the splitting grooves 31 can also be prevented. Other features similar to Embodiments 1 and 2 provide similar advantageous effects as those of Embodiments 1 and 2.

The present invention is explained along Embodiments 1 to 3 but not limited thereto. The present invention may be embodied in other specific forms without departing from the essential characteristics thereof.

The invention claimed is:

1. A magnet splitting device for splitting a magnet pre-split with a splitting groove, wherein the splitting of the pre-split magnet occurs along the splitting groove, the magnet splitting device comprising:
   a one-side holder for holding the pre-split magnet on one side of the splitting groove and
   an other-side holder for holding the pre-split magnet on the other side of the splitting groove,
   wherein the one-side holder and the other-side holder are configured to split apart the pre-split magnet along the splitting groove as a starting point by relative movement of the other-side holder relative to the one-side holder in such a manner as to widen an opening of the splitting groove more than a bottom part of the groove; and
   an actuating unit configured to generate the relative movement of the other-side holder,
   wherein the one-side holder and the other-side holder are configured to hold a plurality of pre-split magnets simultaneously and to split apart these presplit magnets all at once,
   the other-side holder includes a plurality of other-side independent holding parts configured to respectively hold the other sides of the plurality of the pre-split magnets independently and to move independently from each other, and
   the actuating unit includes:
   a plurality of independent actuating parts configured to move independently from each other, wherein each of the plurality of independent actuating parts is attached to a simultaneous operating part,
   wherein each of the plurality of independent actuating parts is further configured to move its corresponding part among the plurality of other-side independent holding parts relative to the one-side holder; and
   the simultaneous operating part is configured to operate the plurality of independent actuating parts simultaneously.

2. The magnet splitting device according to claim 1, wherein
   the simultaneous operating part is formed to be movable, and
   the independent actuating parts each include an actuating resilient member interposed between the simultaneous operating part and each of the other-side independent holding parts so that each of the other-side independent holding parts is urged in a direction in which the relative movement is generated by the movement of the simultaneous operating part.

3. The magnet splitting device according to claim 2, wherein the other-side independent holding parts each include a holding resilient member resiliently holding the other sides of the pre-split magnets.

4. The magnet splitting device according to claim 3, wherein
   the pre-split magnet is in a form having a first main surface with the splitting grooves and a second main surface parallel thereto;
   the one-side holder includes a first one-side holding part pressing the first main surface and a second one-side holding part pressing the second main surface and sandwiching the pre-split magnet between the second one-side holding part and the first one-side holding part;
   the other-side independent holding part of the other-side holder includes a first other-side independent holding portion pressing the first main surface and a second other-side independent holding portion pressing the second main surface and sandwiching the pre-split magnet between the second other-side independent holding portion and the first other-side independent holding portion;
   the first one-side holding part is formed to press a first one-side pressed region of the first main surface, the region extending along the splitting groove and including a first groove edge located on the one side of the splitting groove;
   the first other-side independent holding portion is formed to press a first other-side pressed region of the first main surface, the region extending along the splitting groove and including a second groove edge located on the other side of the splitting groove;
   the second one-side holding part is formed to press a second one-side pressed region of the second main surface, the region extending along and including a first groove edge corresponding portion that will appear on the second main surface when the first groove edge is projected in a direction orthogonal to the second main surface; and
   the second other-side independent holding portion is formed to press a second other-side pressed region of the second main surface, the region extending along and including a second groove edge corresponding portion that will appear on the second main surface when the second groove edge is projected in a direction orthogonal to the second main surface.

5. The magnet splitting device according to claim 2, wherein
   the pre-split magnet is in a form having a first main surface with the splitting grooves and a second main surface parallel thereto;
   the one-side holder includes a first one-side holding part pressing the first main surface and a second one-side holding part pressing the second main surface and sandwiching the pre-split magnet between the second one-side holding part and the first one-side holding part;
   the other-side independent holding part of the other-side holder includes a first other-side independent holding portion pressing the first main surface and a second other-side independent holding portion pressing the second main surface and sandwiching the pre-split magnet between the second other-side independent holding portion and the first other-side independent holding portion;

the first one-side holding part is formed to press a first one-side pressed region of the first main surface, the region extending along the splitting groove and including a first groove edge located on the one side of the splitting groove;

the first other-side independent holding portion is formed to press a first other-side pressed region of the first main surface, the region extending along the splitting groove and including a second groove edge located on the other side of the splitting groove;

the second one-side holding part is formed to press a second one-side pressed region of the second main surface, the region extending along and including a first groove edge corresponding portion that will appear on the second main surface when the first groove edge is projected in a direction orthogonal to the second main surface; and the second other-side independent holding portion is formed to press a second other-side pressed region of the second main surface, the region extending along and including a second groove edge corresponding portion that will appear on the second main surface when the second groove edge is projected in a direction orthogonal to the second main surface.

6. The magnet splitting device according to claim 1, wherein the other-side independent holding parts each include a holding resilient member resiliently holding the other sides of the pre-split magnets.

7. The magnet splitting device according to claim 6, wherein the pre-split magnet is in a form having a first main surface with the splitting grooves and a second main surface parallel thereto;

the one-side holder includes a first one-side holding part pressing the first main surface and a second one-side holding part pressing the second main surface and sandwiching the pre-split magnet between the second one-side holding part and the first one-side holding part;

the other-side independent holding part of the other-side holder includes a first other-side independent holding portion pressing the first main surface and a second other-side independent holding portion pressing the second main surface and sandwiching the pre-split magnet between the second other-side independent holding portion and the first other-side independent holding portion;

the first one-side holding part is formed to press a first one-side pressed region of the first main surface, the region extending along the splitting groove and including a first groove edge located on the one side of the splitting groove;

the first other-side independent holding portion is formed to press a first other-side pressed region of the first main surface, the region extending along the splitting groove and including a second groove edge located on the other side of the splitting groove;

the second one-side holding part is formed to press a second one-side pressed region of the second main surface, the region extending along and including a first groove edge corresponding portion that will appear on the second main surface when the first groove edge is projected in a direction orthogonal to the second main surface; and the second other-side independent holding portion is formed to press a second other-side pressed region of the second main surface, the region extending along and including a second groove edge corresponding portion that will appear on the second main surface when the second groove edge is projected in a direction orthogonal to the second main surface.

8. The magnet splitting device according to claim 1, wherein the pre-split magnet is in a form having a first main surface with the splitting grooves and a second main surface parallel thereto;

the one-side holder includes a first one-side holding part pressing the first main surface and a second one-side holding part pressing the second main surface and sandwiching the pre-split magnet between the second one-side holding part and the first one-side holding part;

the other-side independent holding part of the other-side holder includes a first other-side independent holding portion pressing the first main surface and a second other-side independent holding portion pressing the second main surface and sandwiching the pre-split magnet between the second other-side independent holding portion and the first other-side independent holding portion;

the first one-side holding part is formed to press a first one-side pressed region of the first main surface, the region extending along the splitting groove and including a first groove edge located on the one side of the splitting groove;

the first other-side independent holding portion is formed to press a first other-side pressed region of the first main surface, the region extending along the splitting groove and including a second groove edge located on the other side of the splitting groove;

the second one-side holding part is formed to press a second one-side pressed region of the second main surface, the region extending along and including a first groove edge corresponding portion that will appear on the second main surface when the first groove edge is projected in a direction orthogonal to the second main surface; and the second other-side independent holding portion is formed to press a second other-side pressed region of the second main surface, the region extending along and including a second groove edge corresponding portion that will appear on the second main surface when the second groove edge is projected in a direction orthogonal to the second main surface.

9. The magnet splitting device according to claim 8, wherein the pre-split magnet has a rectangular parallelepiped shape with a third side face and a fourth side face connecting the first main surface and the second main surface and parallel to each other, and a fifth side face and a sixth side face parallel to each other, with the splitting grooves each being orthogonal to the third side face and the fourth side face;

the first one-side holding part is formed to press the first one-side pressed region excluding a first corner portion made between the first main surface and the third side face and a second corner portion made between the first main surface and the fourth side face; and the first other-side independent holding portion is formed to press the first other-side pressed region excluding the first corner portion and the second corner portion.

10. The magnet splitting device according to claim 9, wherein the second one-side holding part is formed to press the second oneside pressed region excluding a third corner portion made between the second main surface and the third side face and a fourth corner portion made between the second main surface and the fourth side face; and the second other-side independent holding portion is formed to press the second other-side pressed region excluding the third corner portion and the fourth corner portion.

* * * * *